United States Patent [19]
Hirano

[11] Patent Number: 5,774,435
[45] Date of Patent: Jun. 30, 1998

[54] DISC DEVICE

[75] Inventor: Yoshiaki Hirano, Kanagawa, Japan

[73] Assignee: Sony Corporation, Tokyo, Japan

[21] Appl. No.: 701,723

[22] Filed: Aug. 22, 1996

[30] Foreign Application Priority Data

Aug. 23, 1995 [JP] Japan ...................................... 7-235918

[51] Int. Cl.⁶ ...................................................... G11B 7/00
[52] U.S. Cl. ................................. 369/50; 369/89; 369/58; 369/47
[58] Field of Search ................................. 369/47, 48, 49, 369/50, 54, 58, 59, 60, 32, 275.1; 360/14.1

[56] References Cited

U.S. PATENT DOCUMENTS 5,471,452  11/1995  Kishi ...................................... 369/58 X
5,515,351  5/1996  Nonaka et al. ............................. 369/58
5,537,387  7/1996  Ando et al. .......................... 369/275.1

Primary Examiner—Muhammad N. Edun
Attorney, Agent, or Firm—Frommer Lawrence & Huag LLP; William S. Frommer

[57] ABSTRACT

A disc device for reproducing and outputting an information signal recorded on a disc-shaped recording medium is disclosed. This disc device reproduces, from the disc-shaped recording medium, an information signal which has been sequentially input, converted to a data structure having a specified format in specified block units and recorded on the medium, and generates a time code for the reproduced information signal based on reproduced information blocks and addresses of these blocks.

5 Claims, 23 Drawing Sheets

FIG. 6

| FRAME PERIOD | 1 BYTE |
|---|---|
| SUBROUTINE FREQUENCY | 1 BYTE |
| BIT LENGTH | 1 BYTE |
| NUMBER OF WORDS PER BLOCK | 2 BYTES |
| NUMBER OF WORDS PER FRAME | 2 BYTES |
| NUMBER OF FRAMES PER HOUR | 4 BYTES |
| NUMBER OF FRAMES PER MINTE | 2 BYTES |
| NUMBER OF FRAMES PER SECOND | 2 BYTES |

FIG. 7

| NO | BIT LENGTH | NUMBER OF WORDS PER BLOCK |
|---|---|---|
| 1 | 16(4) | 1470 |
| 2 | 20(5) | 1176 |
| 3 | 24(6) | 980 |

FIG. 8

| NO | FRAME PERIOD | SAMPLING PERIOD | | |
|---|---|---|---|---|
| | | 44.056kHz | 44.1kHz | 48kHz |
| 1 | 30Hz (SMPTE) | 1468.5 | 1470 | 1600 |
| 2 | 29.9Hz (SMPTE) | 1470.0 | 1471.5 | 1601.6 |
| 3 | 24Hz (EBU) | 1835.7 | 1837.5 | 2000 |
| 4 | 25Hz (FILM) | 1762.2 | 1764.0 | 1920 |
| 5 | 100/3Hz (DAT) | 1320.7 | 1323 | 1440 |

FIG. 14

| NO | FRAME PERIOD | TIME UNITS | | |
|---|---|---|---|---|
| | | HOURS (CH) | MINUTES (CM) | SECONDS (CS) |
| 1 | 30Hz NDF | 108000 | 1800 | 30.0 |
| 2 | 29.97Hz DF | 107896 | 1789 | 30.0 |
| 3 | 29.9Hz NDF | 108000 | 1800 | 30.0 |
| 4 | 24Hz (EBU) | 86400 | 1440 | 24.0 |
| 5 | 25Hz (FILM) | 90000 | 1500 | 25.0 |

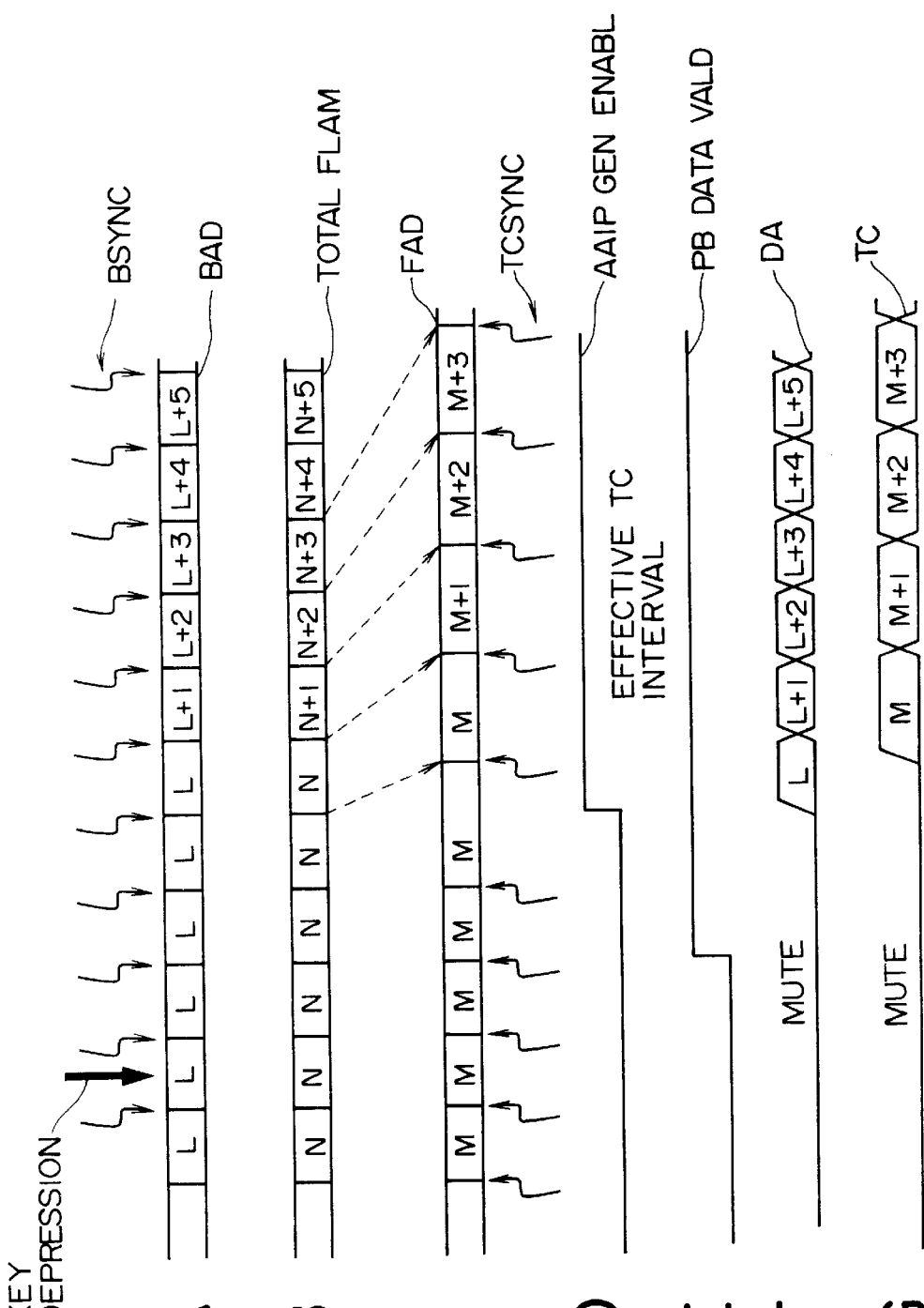

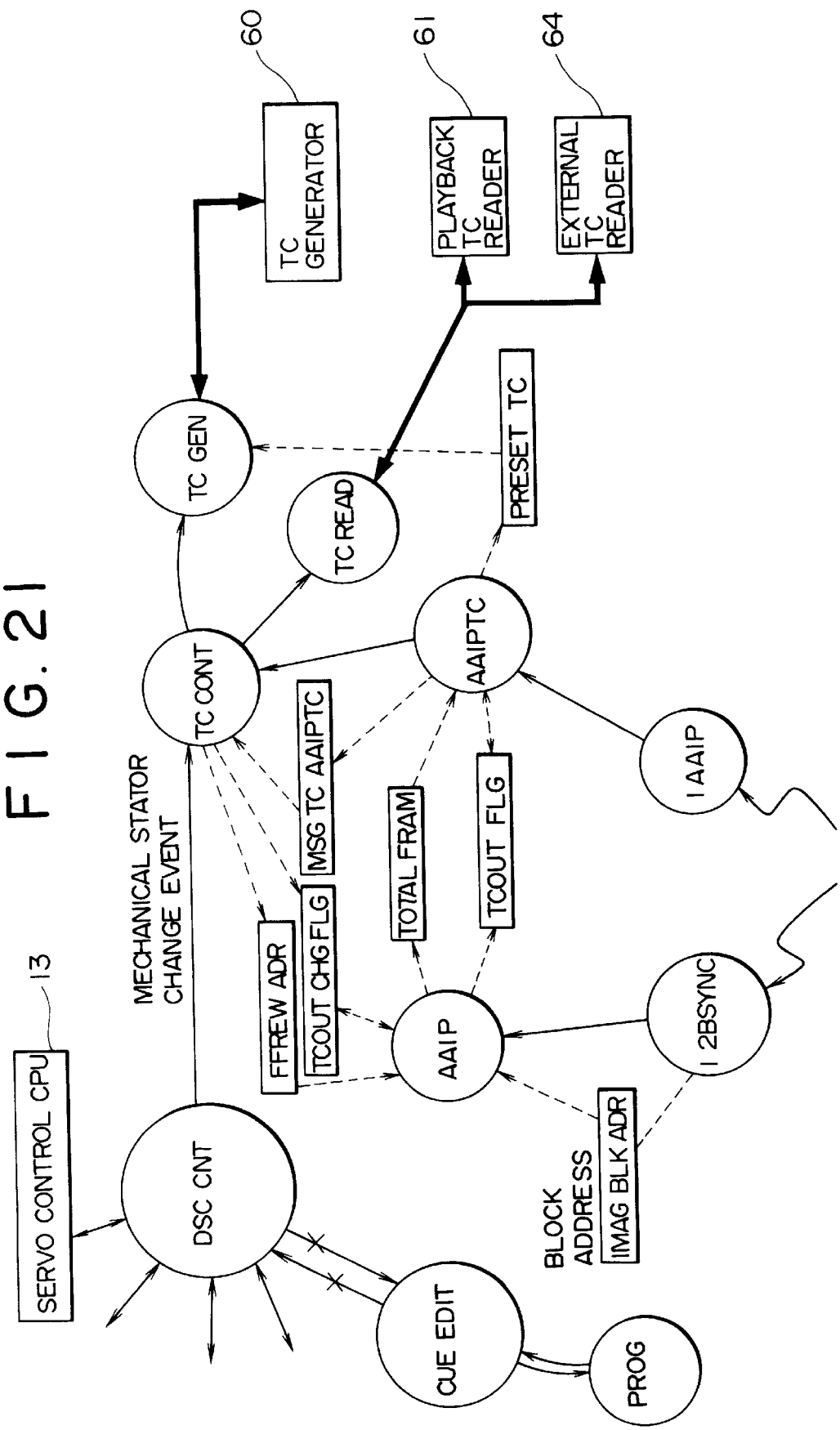

DISC DEVICE

BACKGROUND OF THE INVENTION

This invention relates to a disc device, and in particular to a disc device wherein an audio signal can easily be edited using a disc-shaped recording medium.

When editing was performed using a magnetic tape as a recording medium, an audio signal recorded on this tape was re-recorded on another tape with reference to an in-point and an out-point, this in-point and out-point having been specified based on a time code recorded on the tape together with an audio signal, and the audio material was thereby edited.

The recording medium in this case may also be an optical disc, which is a high capacity disc-shaped recording medium. In this case also, an audio signal recorded on this disc was re-recorded on an optical disc with a new time code with reference to an in-point and an out-point, this in-point and out-point having been specified based on a time code recorded together with the audio signal, and the audio material was thereby edited.

In this type of disc-shaped recording medium, it is conceivable that by making random access possible, the audio signal could be reproduced according to an edit list (EDL: Edit Data List) making effective use of a random access function, and the edit results output directly from the edit list. Hence, when editing an audio signal using this disc-shaped recording medium, it would consequently be unnecessary to re-record the edit results one by one, and editing time could therefore be reduced.

However, when the results of editing this disc-shaped recording medium are output by random access, the audio signal is reproduced discontinuously, unlike the case when a magnetic tape is edited. Therefore when a time code is not recorded together with the audio signal and an operator performs a seek operation when generating an edit list which corresponds to, for example, fast forward of a magnetic tape, it is difficult to know the current position on the disc.

Further, even when a time code is recorded together with the audio signal and the edit results are output from an edit list, the time code which is output is discontinuous, so it was still difficult to verify the edit results.

OBJECT AND SUMMARY OF THE INVENTION

The object of this invention is to provide a disc device wherein an audio signal can easily be edited using a disc-shaped recording medium.

In order to achieve the object of this invention, the disc device according to this invention comprises reproducing means for reproducing an information signal from the aforesaid disc-shaped recording medium, and time code generating means for generating a time code for the information signal reproduced by the reproducing means based on blocks of the aforesaid information signal and addresses of these blocks when the information signal recorded on the disc-shaped recording medium has been sequentially input and converted to a data structure having a specified format in specified block units.

Position information indicating recording and playback positions is previously recorded on the disc-shaped recording medium by preformatting, and the information signal recorded on the disc-shaped recording medium is recorded in the aforesaid block units based on this position information.

Alternatively, the aforesaid time code generating means may generate a time code by advancing the information signal by a specified count means based on these information signal blocks and block addresses.

The time code generating means generates the time code by setting an initial value of the count means from the number of words in the information signal corresponding to the blocks, and advancing the information signal from this initial value, based on the information signal blocks and block addresses.

Alternatively, the aforesaid reproducing means reproduces an information signal according to an edit list specified by a playback sequence, and the aforesaid time code generating means generates the aforesaid time code from a playback start information signal as origin specified by the edit list.

Alternatively, the aforesaid time code generating means changes over operation in a specified operating mode so as to vary the time code in response to the operation of a specified control, and the aforesaid reproducing means reproduces the information signal by blocks corresponding to this variable time code.

When the sequentially input information signal is converted to a data structure having a specified format in specified block units and recorded on the disc-shaped recording medium, time information regarding the information played back can be detected by the reproducing means with reference to the blocks and block addresses of this information signal, hence a time code can be generated based on the blocks and block addresses even in the event of random access.

Further, when position information indicating recording and playback positions is previously recorded on the disc-shaped recording medium by preformatting, and the information signal recorded on the disc-shaped recording medium is recorded in the aforesaid block units based on this position information, each block can be easily and precisely detected using this position information, so a time code can be generated based on blocks and block addresses even in the event of random access.

Alternatively, when the aforesaid time code generating means generates a time code by advancing the information signal by specified count means based on these information signal blocks and block addresses, the time code can be generated corresponding to the information signal which is continuously reproduced after random access.

When the time code generating means generates a time code by setting an initial value of the count means from the number of words in the information signal corresponding to the blocks, and advancing the information signal from this initial value, based on the information signal blocks and block addresses, a time code can be generated so as to comply with a variety of formats even in the event of random access.

When alternatively, the aforesaid reproducing means reproduces the information signal according to an edit list specified by a playback sequence, and the aforesaid time code generating means generates the aforesaid time code from a playback start information signal as origin specified by the edit list, a continuous time code may be output when an information signal is sequentially reproduced and output by the edit list.

Further, when alternatively, the aforesaid time code generating means changes over operation in a specified operating mode so as to vary the time code in response to the operation of a specified control, and the aforesaid reproducing means reproduces the information signal by blocks corresponding to this variable time code, the time code may be advanced while verifying it by, for example, operating a jog dial or the like, and the information signal specified by this time code may then be reproduced.

BRIEF DESCRIPTION OF THE DRAWINGS

FIG. 6 is a diagram showing a time control table.

FIG. 7 is a diagram showing a relation between an audio data bit length and a number of words per block.

FIG. 8 is a diagram showing a relation between a time code frame frequency and a number of words per block.

FIG. 14 is a diagram showing a relation between a frame frequency and a number of words.

FIGS. 15A to 15G are signal waveform diagrams for the purpose of explaining time code generation during recording/playback in the normal mode.

FIG. 21 is a task relationship diagram for the purpose of describing time code generation in fast forward/rewind processing in the normal mode.

DETAILED DESCRIPTION OF THE PREFERRED EMBODIMENTS

Some embodiments of this invention will now be described with reference to appropriate drawings.

Figure 1:
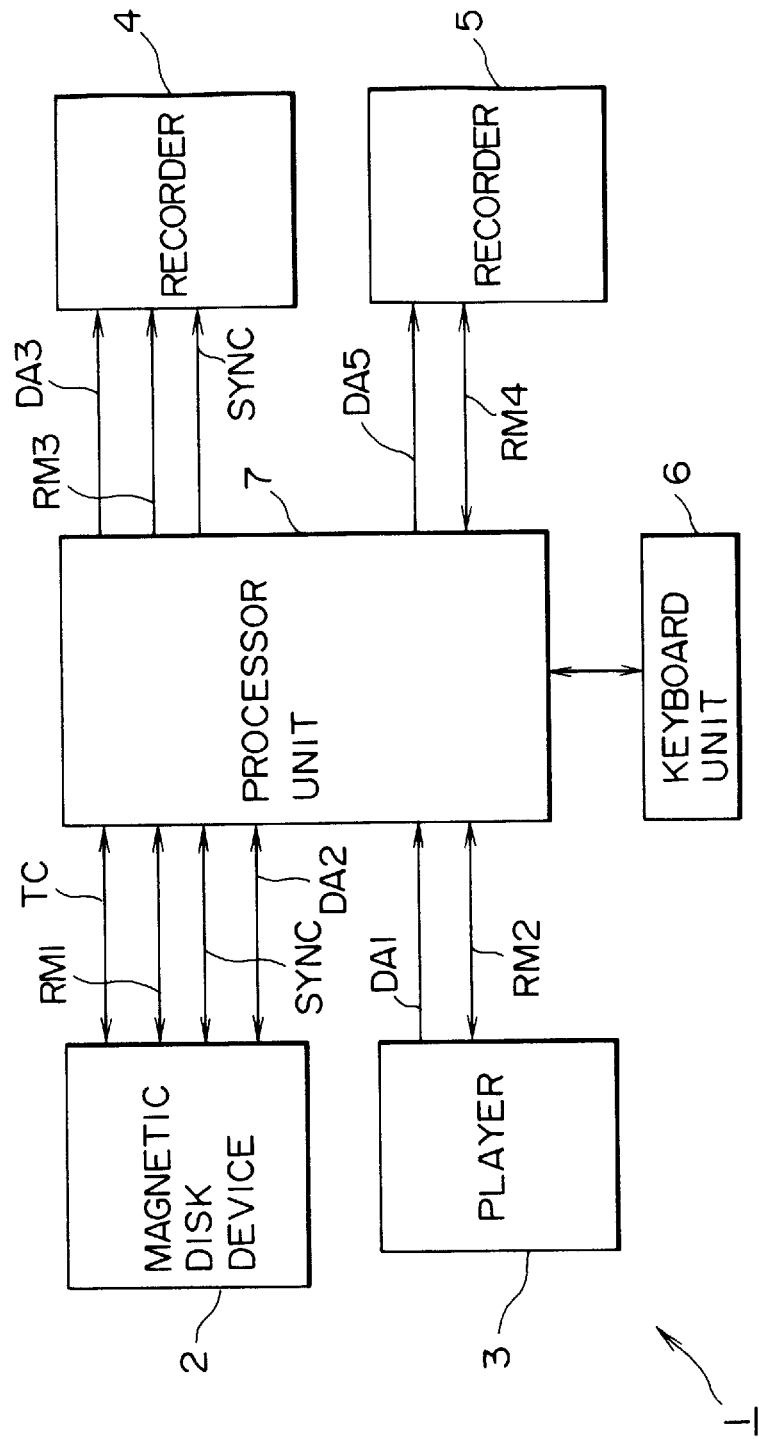
FIG. 1 is a block diagram showing one embodiment of an editing system using the magneto-optic disc device according to this invention.

FIG. 1 is a block diagram showing one embodiment of an editing system according to this invention. This editing system 1 comprises a magneto-optic disc device 2 which functions as a player, in conjunction with a player 3 and recorders 4, 5 using conventional magnetic tape.

In this editing system 1, control commands input via a keyboard 6 are analyzed by a processing unit 7. Operation of the whole system is changed over in response to operator control by remote control signals RM1–RM4 which are output if necessary from this processing unit 7 to the magneto-optic disc device 2, player 3, and recorders 4 and 5. In this way, an audio signal DA1 output by the player 3 can be recorded on the magneto-optic disc device 2, and audio signals DA2, DA1 output by the player 3 can be recorded on the recorders 4 and 5.

In this recording and playback, the processing unit 7 controls the operation of the magneto-optic disc device 2 by a time code TC as necessary, and in addition, performs control such as phase modification by outputting a common synchronization signal SYNC to the magneto-optic disc device 2 and recorder 4. In this way, various types of editing may be performed as necessary.

Figure 2:
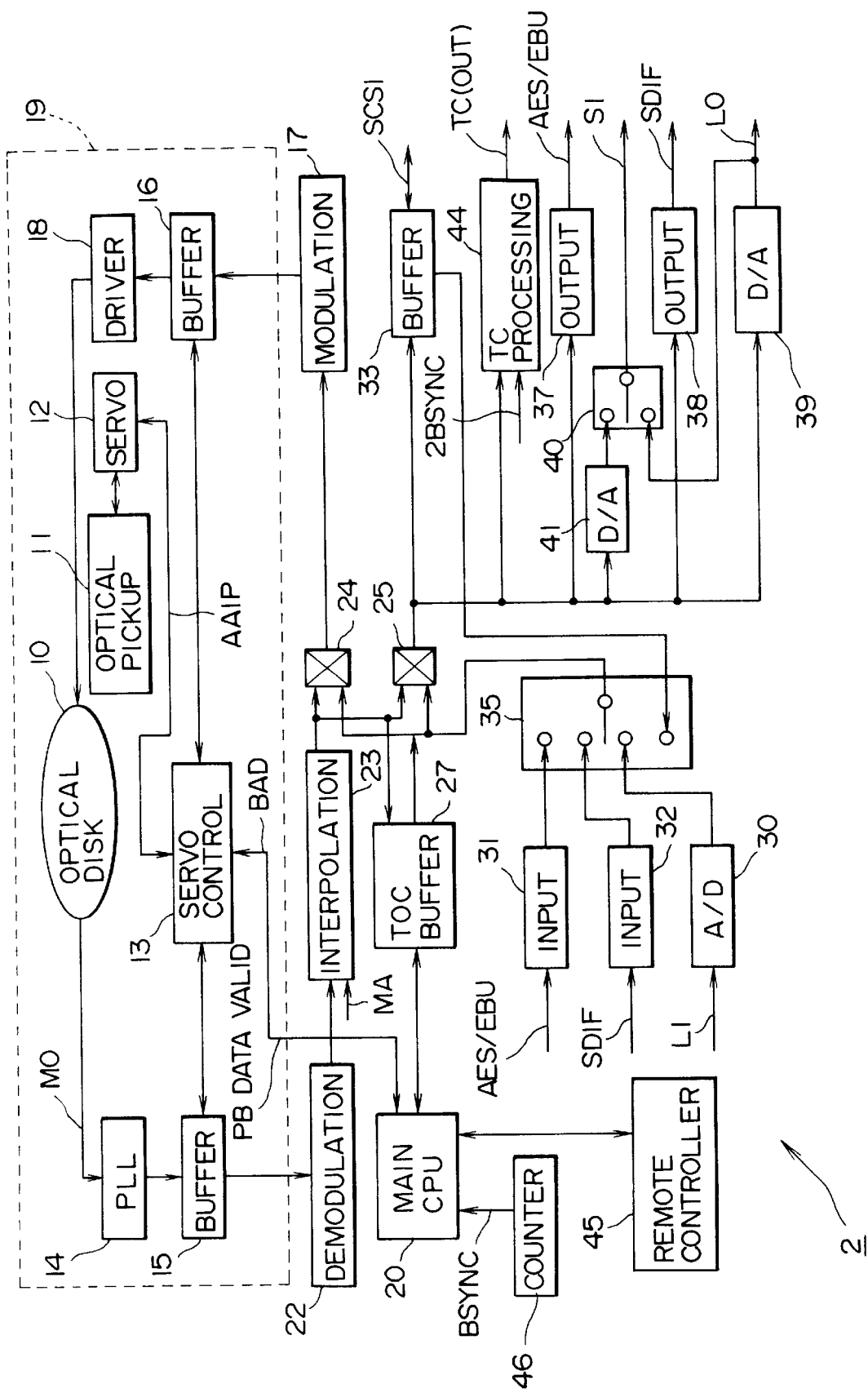
FIG. 2 is a block diagram showing one embodiment of the magneto-optic disc device shown in FIG. 1.

FIG. 2 is a block diagram showing one embodiment of the magneto-optic disc device 2. In this magneto-optic disc device 2, audio signals are recorded on an optical disc 10, and audio signals recorded on the disc 10 are reproduced and output.

Figure 3:
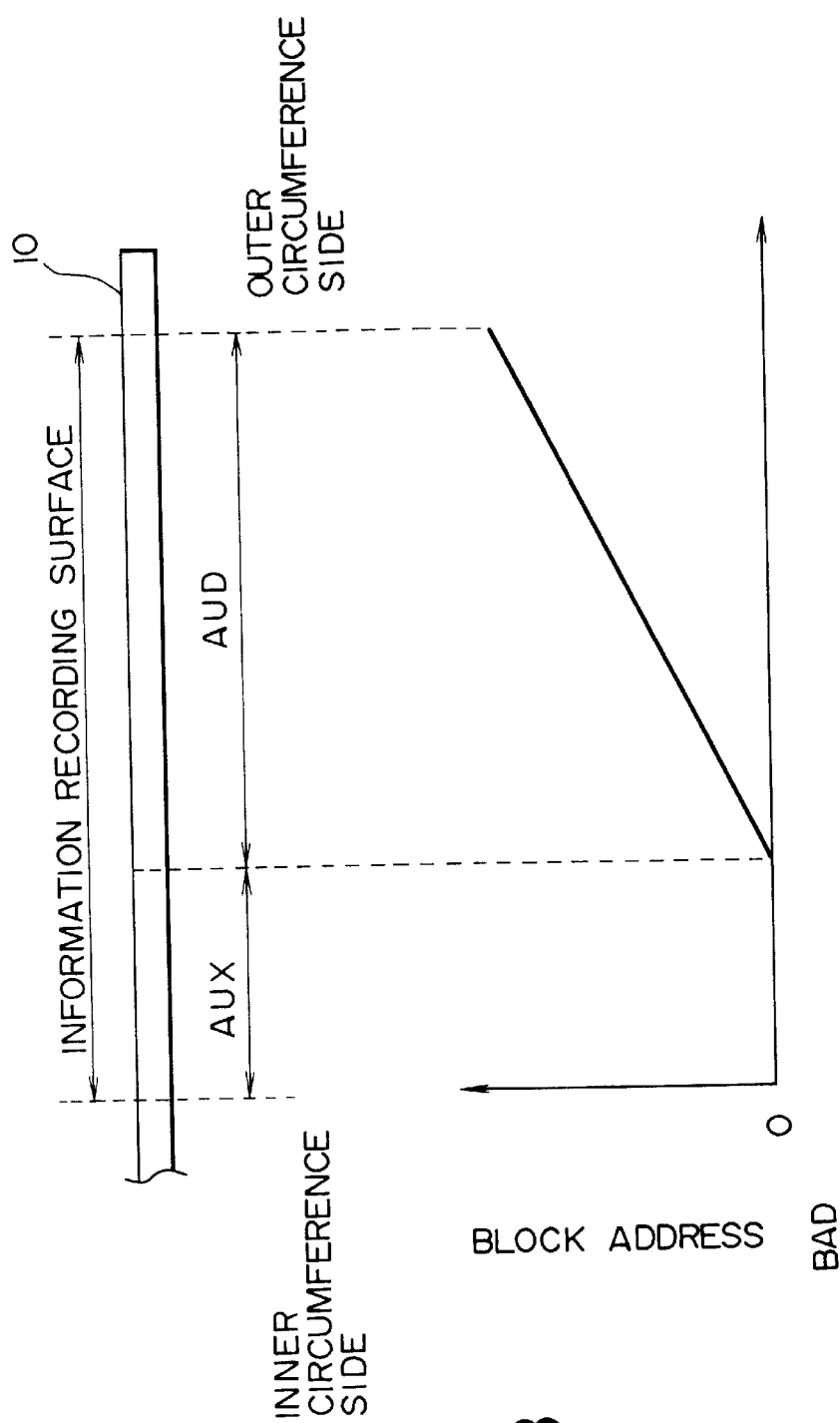
FIGS. 3A and 3B are schematic diagrams for the purpose of describing an information recording surface of an optic disc.

This optical disc 10 comprises a vertically magnetized film adhering to a disc-shaped substrate of polycarbonate or the like. In this way, desired data can be recorded by the thermomagnetic recording technique, and the recorded data can be reproduced by using the magnetic Kerr effect. As shown in FIGS. 3A and 3B, in this magneto-optic disc device 2, the information recording surface of the optical disc 10 is divided into an inner circumference area (represented by a signal AUX (FIG. 4A), and an outer circumference area (represented by a signal AUD). An audio signal is recorded on the outer circumference area AUD, and control data for this audio signal (i.e. data such as TOC (Table of Contents) and edit lists, etc.) is recorded on the inner circumference area AUX.

A pre-groove comprising a laser beam guide groove is first formed on the information recording surface, i.e. the vertically magnetized film, of this optical disc 10 so as to permit tracking control of the disc. This pre-groove is formed so that its trace is based on a specified reference period, and the optical disc 10 can be rotated at a fixed linear speed based on the trace of the pre-groove. The trace of the pre-groove is moreover formed such that its period is frequency modulated from a specified address AAIP (Absolute Address in Pre-groove).

A recording/playback position on the optical disc 10 may therefore be detected based on this address AAIP, and in the magneto-optic disc device 2, audio data is recorded and played back in specified block units based on this address AAIP. Hence, audio data can be controlled, recorded and played back in the audio data recording area AUD by block addresses (referred to hereinafter as block addresses, BAD (FIG. 4B) which are sequentially advanced from the inner circumference.

In the magneto-optic disc device 2, when this optical disc 10 is being rotated by a spindle motor, the disc is irradiated by a laser beam from an optical pickup 11, and the return light from this laser beam is received by the optical pickup 11.

From this return beam, a tracking error signal whereof the signal level varies according to a tracking error amount, a focus error signal whereof the signal level varies according to a focus error amount, a wobble signal whereof the signal level varies so as to follow the trace of the pre-groove, and a playback signal MO whereof the signal level varies according to the plane of polarization of the return beam, are generated and output.

A servo circuit 12 performs tracking control and focus control of the optical pickup 11 based on the tracking error signal and focus error signal. The servo control circuit 12 also controls the rotation speed of the spindle motor such that the center frequency of the wobble signal is a specified frequency, and the optical disc 10 is thereby rotated at a fixed linear speed.

The servo circuit 12 generates a clock based on this wobble signal, frequency demodulates this wobble signal so as to detect the address information AAIP of the laser beam irradiation position, and outputs this block and address information AAIP to a servo control circuit 13. The servo circuit 12 also causes the optical pickup 11 to seek desired recording/playback positions in response for example to track jump commands output by the servo control circuit 13 based on this address information AAIP.

A PLL circuit 14 generates playback blocks from the playback signal MO output by the optical pickup 11. After this playback signal MO is binarized by a playback signal processing circuit, not shown, it is sequentially latched based on this playback block, and playback data is generated based on the playback signal MO. A buffer 15 which comprises a high capacity FIFO (First In, First Out) for storing this playback data, stores sequentially input playback data and outputs the stored playback data by a clock having a period of 2.5 times compared to when data is stored.

In this magneto-optic disc device 2, caching is performed by this buffer 15 for playback data so that even when for example track jump is repeated by an edit list, breaks in the sound are effectively avoided.

A buffer 16 which comprises a high capacity FIFO (First In, First Out) as in the case of the buffer 15, sequentially stores data output by a modulating circuit 17, and outputs stored data by a clock having a period of 1/2.5 times compared to when data is stored. In this way, in the magneto-optic disc device 2, data output by the modulating circuit 17 is cached by the buffer 16, so even when for example track jump is performed repeatedly, continuous audio can be recorded without interrupting input of audio signals.

A driver 18 drives a modulating coil according to the data output by the buffer 16. In the magneto-optic disc device 2, during recording, the light amount of the laser beam increases to the amount necessary for recording, a modulating magnetic field is applied to the beam irradiation position, and data output by the modulating circuit 17 is sequentially recorded by a thermomagnetic recording technique.

Figure 4:
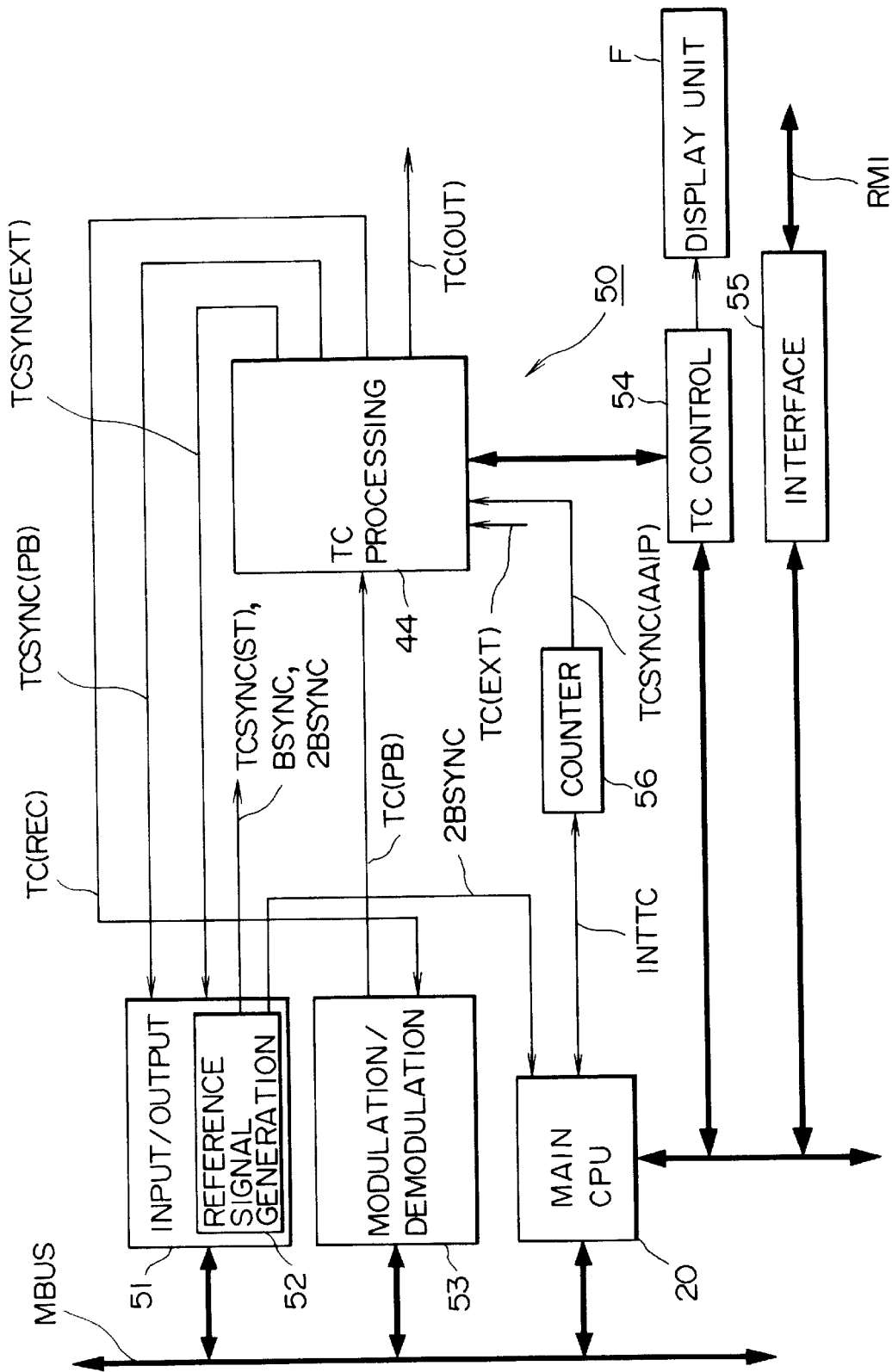
FIG. 4 is a block diagram diagram showing a time code processing system of the magneto-optic disc device shown in FIG. 1.

The servo control circuit 13 comprises a microcomputer which controls the operation of the whole recording/playback system comprising the central processing unit and peripheral circuits. The operation of an entire recording/playback system 19 is controlled so that the speed of transferring audio data to the optical disc 10 is 2.5 times higher than the input/output data transfer speed by this magneto-optic disc device 2. This control is performed by controlling a spindle servo by the servo circuit 12 such that the address information AAIP obtained from the optical disc 10 retains a specified phase relationship relative to a reference signal generated with a period of 1/2.5 of this block by a specified reference signal generating circuit 52 (FIG. 4).

The servo control circuit 13 performs conversion processing of the address information AAIP and block address BAD. When a seek command specified by the block address BAD is input by a main central processing unit (CPU) 20, the address information AAIP corresponding to this block address BAD is calculated, the servo circuit 12 is controlled so that the optical pickup 11 is caused to seek the recording/playback position specified by this calculated address information AAIP, and recording/playback begins.

The servo control circuit 13 also controls operation of the buffers 15 and 16 during playback. During playback, when 50 blocks of playback data have been stored, they are sequentially transmitted in storage order. During storage, the servo control circuit 13 stores playback data with a clock period of 2.5 times, and during transmission, playback data is output with a clock period of 1 times. During jog processing and shuttle processing, the servo control circuit 13 outputs playback data from the buffer 15 without waiting for 50 blocks of playback data to be stored. At that time, the servo control circuit 13 outputs data for each block in synchronism with and based on a block sync BSYNC output by a specified reference signal generating circuit. During recording, on the other hand, the servo control circuit 13 controls the operation of the buffer 16 unlike the case of playback. Output data output by the modulating circuit 17 based on the block sync BSYNC is then stored in the buffer 16, and data stored in the buffer 16 is output to the driver 18.

In this sequence of steps, the servo control circuit 13 causes the signal level of a playback data hybrid signal PB DATA VALID to rise in synchronism with the block sync BSYNC when audio data is output by the buffers 15 and 16, and transmission of this audio data is notified to other processing circuits.

When the operator selects the monitor recording mode, recording and playback are repeated alternately by the recording/playback system 19 with a specified block period. Further, in the recording/playback system 19, audio data recorded on or played back from the optical disc 10 is output by the buffers 16 and 15 with respectively time axis compression and time axis lengthening. Therefore when the magneto-optic disc device 2 is viewed overall from the viewpoint of an external instrument, as continuous audio data is being recorded, the audio data which has just been recorded can be monitored.

The demodulating circuit 22 processes playback data output by the buffer 15 in block units based on the block sync BSYNC. Specifically, after playback data has been demodulated according to the format specified by this magneto-optic disc device 2, it is interleaved in block units. The demodulating circuit 22 then performs error correction on the playback data in block units, and audio data is thereby demodulated and output. An interpolation circuit 23 interpolates the audio data output by this demodulating circuit 22, and outputs it to cross faders 24 and 25. During this signal processing, the interpolation circuit 23 suppresses the audio data in response to a control signal MA output by the main central processing unit 20.

The modulating circuit 17 receives the audio data output by the cross fader 25 based on the block sync BSYNC in block units, and adds an error correction code to each block. The modulating circuit 17 also interleaves this audio data in block units, the sequence of serial data which is thereby obtained is coded by a coding system suitable for recording on the optical disc 10, and the data is output.

In the magneto-optic disc device 2, when the optical disc 10 is full, control data recorded in the inner circumference area AUX is reproduced, while in the interpolation circuit 23, interpolation is stopped and the reproduced control data is stored in a TOC buffer 27. Further in this magneto-optic disc device 2, after audio data is recorded on the optical disc 10, recording control data which is part of the control data stored in the TOC buffer 27 is output to the modulating circuit 17 when the optical disc 10 is ejected, and the inner circumference area AUX is then updated by the recording control data stored in the TOC buffer 27.

In this way, in the magneto-optic disc device 2, audio data recorded in an outer circumference area AOD is recorded or played back based on the recording control data recorded in the inner circumference area AUX of the optical disc 10.

In the magneto-optic disc device 2, audio data is input and output between these cross faders 24, 25 and an external instrument, and desired audio data is recorded on the optical disc 10. Further, audio data reproduced by this optical disc 10 is sent to the external instrument, the reproduced audio data is edited, and then this data is recorded on the optical disc 10.

Specifically, in the magneto-optic disc device 2, a line input audio signal LI is received by an analog/digital conversion circuit (A/D) 30, and this audio signal L1 is analog/digital converted by a sampling frequency specified by the operator. An input circuit 31 inputs audio data AES/EBU in a format specified by AES/EBU, and an input circuit 32 inputs audio data SDIF according to a specified serial data interface. A buffer 33 receives audio data from an external instrument via a SCSI (Small Computer System Interface), and audio data output by the cross fader 25 is output to the external instrument.

The analog/digital conversion circuit 30, input circuits 31, 32, and buffer 33 operate based on the block sync BSYNC, and the various audio data are output in word units corresponding to this block.

A selection circuit 35 changes over a contact point in response to a selection operation by the operator so as to select the audio data output by the analog/digital conversion circuit 30, the audio data input by the input circuit 31 or 32, or the audio data input by the buffer 33, and the selected data is then output to the cross faders 24 and 25.

An output circuit 37 outputs audio data output by the cross fader 25 in a format specified by AES/EBU (AES/EBU), and an output circuit 38 outputs audio data output by the cross fader 25 corresponding to the input circuit 32 according to a specified serial data interface (SDIF). A digital/analog conversion circuit (D/A) 39 performs digital/analog conversion on audio data output by the cross fader 25, and transmits it as a line output (LO). In these output systems, a selection circuit 40 receives audio data output by the cross fader 25 via a digital/analog conversion circuit 41, the line output audio signal LO is received from the digital/analog conversion circuit 39, and the selected output is output to headphones.

The cross faders 24 and 25 respectively receive audio data input by the selection circuit 35 and audio data input by the interpolation circuit 23. Operation is changed over in response to a control signal output by the main central processing unit 20 corresponding to an operation by the operator, input audio data is selected and output, processing such as cross fading and mixing is performed, and data is output. In the magneto-optic disc device 2, audio data from the cross faders 24 and 25 is selected and output, reproduced audio data is sent to an external instrument, and input data is recorded on the optical disc 10 while being monitored by the external instrument. If necessary, the reproduced data can be edited, and re-recorded on the optical disc 10.

A time code processing circuit (TC processor) 44 generates and outputs a time code TC required by the operator for the audio data transmitted to this external instrument. In the same way, the time code processing circuit 44 also generates a time code TC required by the operator during recording. In the magneto-optic disc device 2, this time code TC is multiplexed by the audio data, or only the time code TC is recorded on the optical disc 10. Alternatively during playback, this recorded time code multiplexed by the audio data, or the time code recorded separately, is processed by the time code processing circuit 44.

The remote controller 45 comprises a controller which controls the operation of this magneto-optic disc device 2 separately from the aforesaid processor unit 7 which was described in the case of FIG. 1.

The main central processing unit 20 comprises a microcomputer which controls the overall operation of this magneto-optic disc device 2, and issues control commands to the servo control circuit 13 and time code control circuit 54 (FIG. 5), etc., in response to control commands input by the remote controller 45 or in response to the operation of a control disposed on a control panel of this magneto-optic disc device 2. The main central processing unit 20 also sequentially advances the block sync BSYNC and generates the block address BAD.

A counter 46 generates and outputs a reference signal 2BSYNC in synchronism with this block sync BSYNC, the signal level of 2BSYNC varying with 2 times the period of BSYNC. This counter 46 may also be implemented by software processing in the main central processing unit 20.

FIG. 4 is a block diagram showing this time code processing system. In a time code processing system 50, the operation of the time code processing circuit 44 is changed over by the main central processing unit 20 so as to generate the required time codes.

An input/output circuit 51 comprises the aforesaid analog/digital conversion circuit 30, input circuits 31, 32, output circuits 37, 38, digital/analog conversion circuits 39, 41, and a reference signal generating circuit 52, and it is connected to the main central processing unit 20 via a main bus MBUS. In this way, in the magneto-optic disc device 2, the operation of the input/output circuit 51 is controlled by the main central processing unit and audio signals are exchanged with a desired external instrument.

Of these circuits, the reference signal generating circuit 52 generates the aforesaid block sync BSYNC and outputs it to the signal processing circuits, and the reference signal 2BSYNC generated by the counter 46 is supplied to the processing system for these time codes. The reference signal generating circuit 52 is controlled by the main central processing unit 20, and a pseudo-time code sync TCSYNC (ST) corresponding to the time code generated by the time code processing circuit 44, is generated and output to the time code processing circuit 44. This pseudo time code sync TCSYNC (ST) is so constructed that its signal level rises in synchronism with the block sync BSYNC. Hence in the magneto-optic disc device 2, even when the time code processing circuit 44 cannot be driven due, for example, to the fact that the time code sync TCSYNC (AAIP) cannot be obtained in the stop state, the time code processing circuit 44 can still be driven using the pseudo-time code sync TCSYNC (ST) instead of the time code sync TCSYNC (AAIP) as necessary.

A modulating/demodulating circuit 53 comprises a signal processing system extending from the demodulating circuit 22 to the modulating circuit 17 via the cross faders 24, 25, and likewise is connected to the central processing unit 20 via the main bus MBUS.

In this way, in the magneto-optic disc device 2, the operation of the modulating/demodulating circuit 53 is controlled by the main central processing unit 20, and recording/playback operations are changed over.

The time code control circuit (TC control) 54, which is controlled by the main central processing unit 20, changes over the operation of the time code processing circuit 44. The time code control circuit 54, which also accepts operations of controls disposed on the control panel of this magneto-optic disc device 2, is connected to the main central processing unit 20, and time codes, etc., are displayed by specified display means.

The time code processing system 50 is controlled by this time code control circuit 54 so that its operation changes over to correspond with the operating mode of the magneto-optic disc device 2. Time codes TC (REC) recorded on the optical disc 10 are generated and output to the input/output circuit 51, while time codes TC (OUT) sent to external instruments are also generated and output.

The time code processing system 50 generates these time codes from time codes TC (PB) reproduced from the optical disc 10, from time codes TC (EXT) input from external instruments, and based on a time code sync TCSYNC (AAIP) output by the counter 56. At the same time, it generates operating reference time code syncs TCSYNC (PB) and TCSYNC (EXT), and outputs them to the input/output circuit 51.

In this embodiment of the invention, the main central processing unit 20 is connected to an interface circuit 55 via a specified bus. In this way, operation can be changed over by a remote control signal RMI input from an external instrument in addition to the remote controller 45. The display unit F is controlled by the time code control circuit 54 so as to drive a liquid crystal display panel that displays time codes, etc.

In this embodiment, when audio data recorded on the optical disc 10 is played back and a time code is recorded together with this audio data, this time code TC (PB) is output to an external instrument so that editing can be performed.

However, when a time code is not recorded together with the audio data, it is difficult to verify a time code for desired audio data after seek has been performed. Also, when the operator desires a different time from that recorded on the optical disc 10, it is difficult to generate the time code simply. In this embodiment, therefore, a time code sync TCSYNC (AAIP) which is a time code reference, is generated based on a block sync BSYNC and block address BAD, and a time code is generated from this time code sync TCSYNC (AAIP).

In other words, in this embodiment, the main central processing unit 20 specifies a block address BAD and issues a playback command to the servo control circuit 13. In the servo control circuit 13, address information AAIP is calculated from this block address BAD, and audio data specified by the block address BAD from the calculation result is played back and output.

Hence when playback data is input from the buffer 15 to the demodulating circuit 22, as this playback data is playback data at the block address BAD specified by the servo control circuit 13, the block address BAD is sequentially advanced in synchronism with the block sync BSYNC from this playback data, and corresponding block addresses BAD are thereby generated relative to audio data which is sequentially played back.

At this time, the main central processing unit 20 sets a time code generation flag AAIP GEN ENABL which is delayed by 2 block periods compared to the playback data hybrid signal DATA VALID. When this time code generation flag AAIP GEN ABLE is set, an interrupt is accepted by the reference signal 2BSYNC, and the interrupt processing sequence of the time code sync shown in FIG. 6 is executed. In other words, in this interrupt processing, the main central processing unit 20 moves from a step SP1 to a step SP2, and a total word count is detected for audio data up to the time when the interrupt is received from the audio data record start position on the optical disc 10.

As shown in FIG. 6, in this magneto-optic disc device, a time control table is generated in the TOC buffer 27 according to a time code format specified by the operator, or according to recording control data recorded in the inner circumference area of the optical disc 10, and the main central processing unit 20 acquires the data necessary to generate a time code from this time control table.

In this time control table, the format of the time code is specified. The time code frame frequency, audio data sampling frequency and audio data bit length are respectively recorded by 1 byte of data; the number of words per block of audio data and number of words of audio data per frame are respectively recorded by 2 bytes of data; and the number of frames per hour, minute and second are respectively recorded.

In this magneto-optic disc device 2, 5880 bytes of audio data can be recorded per block, and as shown in FIG. 7, audio data can be recorded by 16 bits (4 bytes length), 20 bits (5 bytes length) or 24 bits (6 bytes length) by an operator selection. In this way, the number of words per block is set at a bit length of respectively 1470 words, 1176 words or 980 words.

The main central processing unit 20 multiplies the sequentially advanced block address BAD or the block address specified by the servo control circuit 13 by the number of words per block specified in FIG. 8 so as to detect the total number of words.

Next, in a step SP3, the main central processing unit 20 divides this total number of words by the number of words per frame of the time code, and thereby detects the total number of frames required in the time code and a surplus number of words for audio data up to the time when the interrupt is received from the audio data record start position.

In this magneto-optic disc device 2, as shown in FIG. 8, audio data may be recorded at a sampling frequency of 44.056 kHz, 44.1 kHz or 48 kHz. The format of the time code may correspond to the format specified by SMPTE (Society of Motion Picture and Television Engineers) (represented by NO1 and NO2 depending on whether or not there is a drop frame), the format specified by EBU (European Broadcasting Union) (NO3), the format corresponding to a motion picture film (NO4), or a format corresponding to a digital audio tape recorder (NO5).

From these sampling frequencies and time code formats, the number of words per frame of each time code is determined. In the main central processing unit 20, the total number of words is divided by the number of words per frame of the corresponding time code so as to detect the total number of frames and surplus number of words.

Next, the central processing unit 20 moves to a step SP4, and after the surplus words are set by the counter 56 (FIG. 4), the routine moves to a step SP5 and the processing sequence is terminated.

The counter 56 comprises a counter which sequentially counts down these set surplus words in words of audio data input and output by the input/output circuit 51 as units, and when the count value is 0, the time code sync TCSYNC is output. In this way, in this magneto-optic disc device 2, the time code sync TCSYNC (represented hereinafter by the additional symbol (AAIP) to distinguish it from other time codes), of which the signal level rises when various time code frames occur, is generated based on blocks which are processing units of audio data recorded on the optical disc 10.

By dividing the total number of words by the number of words per frame to generate the time code sync TCSYNC (AAIP), when one frame period of the time code is longer than the period of the block sync BSYNC, the time code sync TCSYNC (AAIP) can be correctly generated based on the timing of the block sync BSYNC as shown in FIGS. 9A to 9E. In other words, in the main central processing unit 20, by having the block sync BSYNC (FIG. 9B) occur at the beginning of each block specified by the block address BAD (FIG. 9A), and by detecting the total number of words based on the timing of the block sync BSYNC in this way, a phase difference a between the timing of this block sync BSYNC and the start timing of the next frame in the time code (represented by a frame address FAD, FIG. 9C), may be expressed by the surplus number of words.

Figure 9:
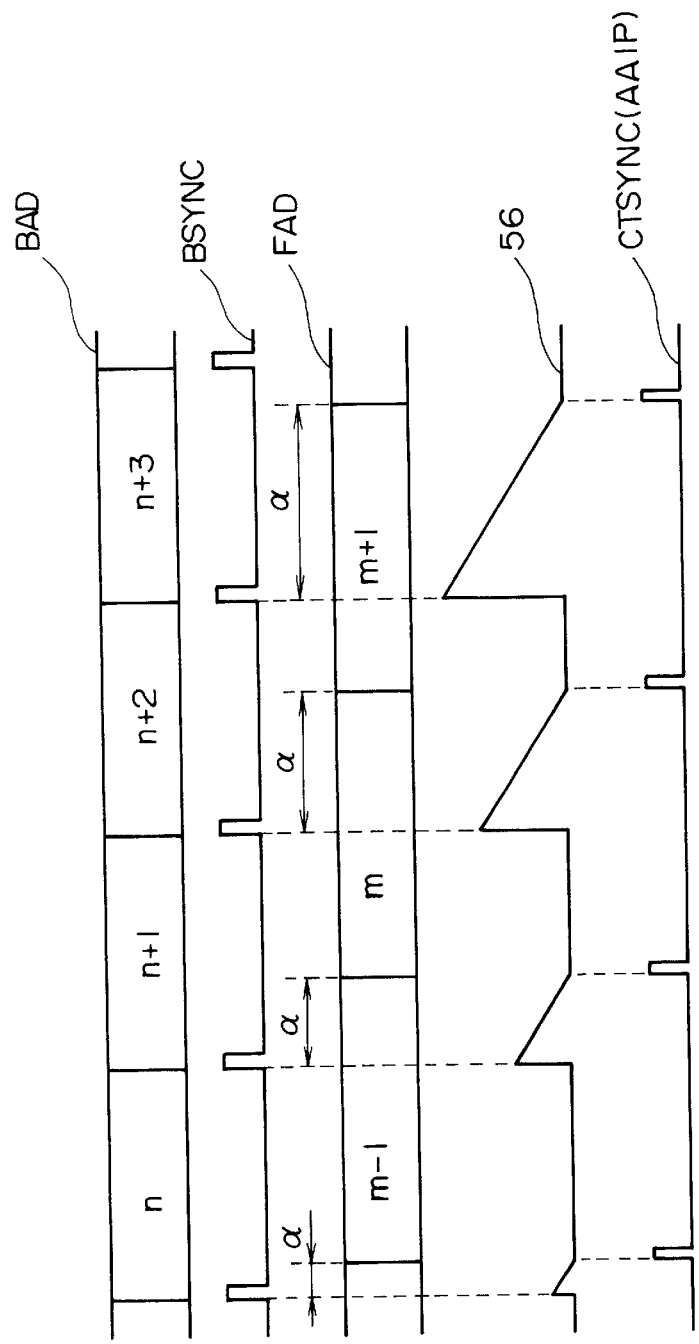
FIGS. 9A to 9E are signal waveform diagrams for the purpose of explaining time code sync generation.

This surplus number of words is therefore counted down by the counter 56 (FIG. 9D), and the time code sync TCSYNC (AAIP) is generated correctly when the count value falls to 0 (FIG. 9E).

However when one frame period of the time code is shorter than one period of the block sync BSYNC, as shown in Figs. 10A to 10E, it is difficult to generate the time code sync TCSYNC (AAIP) correctly. Consequently, in the magneto-optic disc device 2, the aforesaid time code sync interrupt processing sequence is executed using the reference signal 2BSYNC, which has ½ the period of the block sync BSYNC, instead of the block sync BSYNC.

Figure 10:
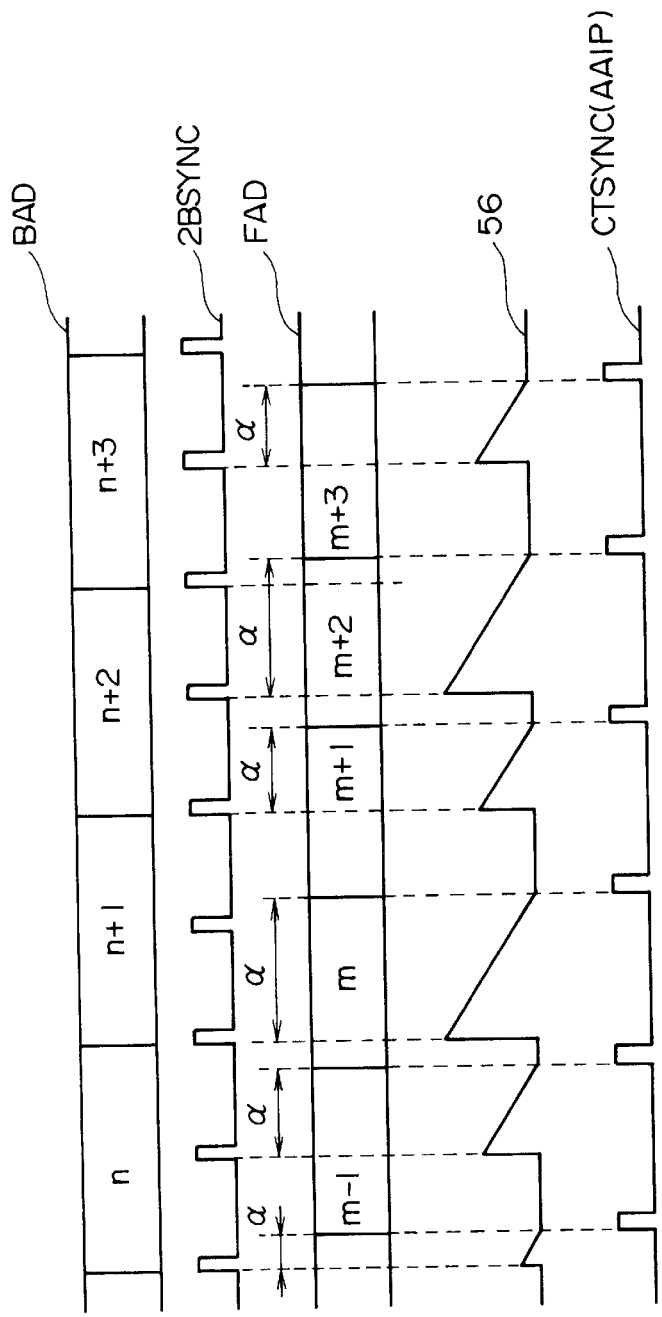
Figs. 10A to 10E are signal waveform diagrams for the purpose of explaining the actual processing of FIGS. 9A to 9E.

In other words, in the main central processing unit 20, the reference signal 2BSYNC occurs at the start of each block specified by the block address BAD (FIG. 10A) and at an intermediate time (FIG. 10B). In this case, the phase difference a between the reference signal 2BSYNC and the beginning of the next frame in the time code (FIG. 10C) is represented by the surplus number of words.

This surplus number of words is therefore counted down by the counter 56 (FIG. 10D), and the time code sync TCSYNC (AAIP) is generated correctly when the count value falls to 0 (FIG. 10E).

To generate the time code sync TCSYNC (AAIP), when the block address BAD is specified by the main central processing unit 20 and a playback command is issued, the servo control circuit 13 increases the signal level of the playback data hybrid signal PB DATA VALID when playback data is input to the demodulating circuit from the buffer 15.

Assuming that the time code TCSYNC (AAIP) is correctly generated by the aforesaid sequence, in the magneto-optic disc device 2, playback processing must be performed and it is difficult to generate the time code sync TCSYNC (AAIP). Hence, in this processing, it is also difficult to generate time codes based on the time code sync TCSYNC (AAIP).

To deal with this problem, a time code generating flag AAIP GEN ENABL is set two blocks later than this playback data hybrid signal PB DATA VALID, and after playback data input to the demodulating circuit 22 from the buffer 15 is interleaved, the central main processing unit 20 sets the generating flag AAIP GEN ENABL when error correction is performed and the data is output.

In the magneto-optic disc device 2, therefore, time codes can be correctly generated in the time code processing circuit 44 based on the playback data hybrid signal PB DATA VALID and the time code generating flag AAIP GEN ENABL.

Figure 11:
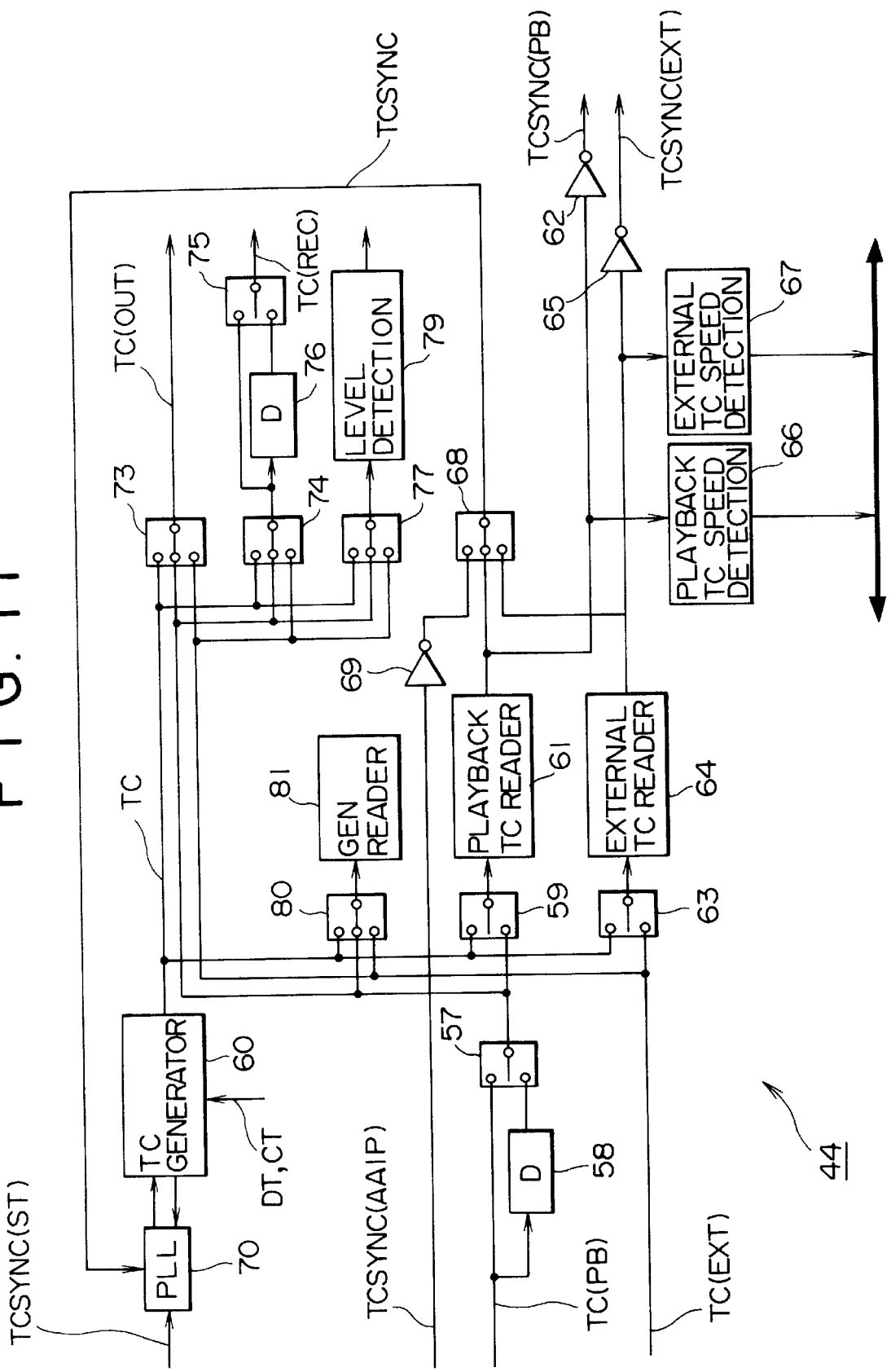
FIG. 11 is a block diagram showing a time code processing circuit in the embodiment of the magneto-optic disc device shown in FIG. 1.

FIG. 11 is a block diagram showing the time code processing circuit 44. This time code processing circuit 44 inputs the time code TC (PB) obtained by playing the optical disc 10 to a selection circuit 57 from the modulating/demodulating circuit 53 (FIG. 4), and this time code TC (PB) is input to the selection circuit 57 via a time-adjusting delay circuit 58. The selection circuit 57 changes over a contact point corresponding to the output format of audio data selected by the operator via the time code control circuit 54, and the time code TC (PB) which is the selected output is input to a selection circuit 59.

This selection circuit 59 changes over a contact point via the time code control circuit 54 depending on the operating mode selected by the operator, and the time code TC (PB) or the time code TC output by a time code generator (TC generator) 60 is output by a playback time code reader (playback TC reader) 61.

The playback time code reader 61 is controlled by the main central processing unit 20 via the time code control circuit 54 so as to change over operation. A time code sync TCSYNC (PB) whereof the signal level appears at the start of each frame is generated relative to the time code output by the selection circuit 59, and an inverter circuit 62 inverts and amplifies this time code sync TCSYNC (PB) so as to output it to the input/output circuit 51 (FIG. 4).

In the time code processing circuit 44, therefore, a time code sync TCSYNC (PB) is generated based on the time code TC (PB) reproduced from the optical disc 10 together with the audio signal, a time code sync TCSYNC (PB) is generated based on the time code TC generated by the time code generator 60, and audio data reproduced from the optical disc 10 can be processed in the input/output circuit 51 based on this time code sync TCSYNC (PB).

The playback time code reader 61 detects hours, minutes, seconds and frames for the time codes output by the selection circuit 59. The magneto-optic disc device 2 is thus constructed so that it can verify the time codes output by the selection circuit 59 in the main central processing unit 20, and can display them via the specified display unit F.

A selection circuit 63 changes over the contact point via the time code control circuit 54 depending on the operating mode selected by the operator. The time code TC (EXT) input from an external instrument or the time code TC output by the time code generator 60 is output to an external time code reader (external TC reader) 64.

Figure 5:
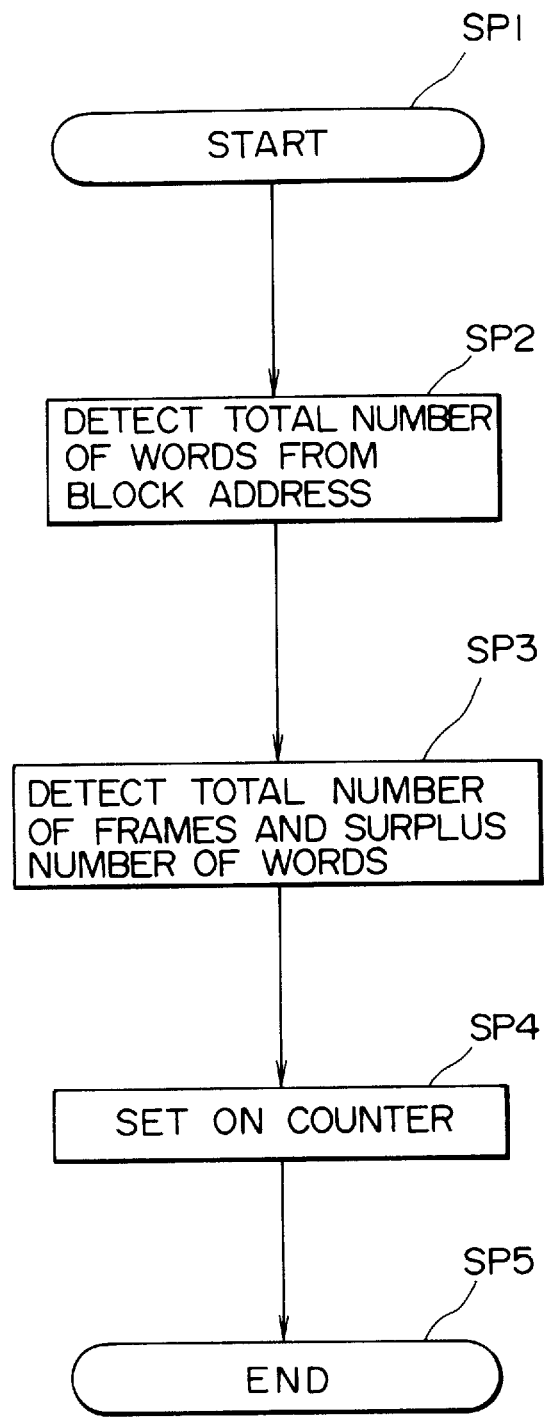
FIG. 5 is a flowchart for the purpose of explaining time code sync generation by a main control processing unit 20 shown in FIG. 2.

The external time code reader 64 is controlled by the main central processing unit 20 via the time code control circuit 54 so as to change over operation. The time code sync TCSYNC (EXT) whereof the signal level appears at the start of each frame is generated relative to the time code output by the selection circuit 63, and an inverter circuit 65 inverts and amplifies this time code sync TCSYNC (EXT) so as to output it to the input/output circuit 51 (FIG. 5).

In the time code processing circuit 44, therefore, a time code sync TCSYNC (EXT) is generated based on the time code TC (EXT) input from an external instrument, a time code sync TCSYNC (EXT) is generated based on the time code TC generated by the time code generator 60, and audio data reproduced from the optical disc 10 or audio data input from an external instrument can be processed in the input/output circuit 51 based on this time code sync TCSYNC (EXT).

The external time code reader 64 detects hours, minutes, seconds and frames for the time codes output by the selection circuit 63. The magneto-optic disc device 2 is thus constructed so that it can verify also the time codes output by the selection circuit 63 in the main central processing unit 20, and can display them via the specified display unit F.

A playback time code speed detecting circuit 66 detects the speed of the time codes input from the playback time code reader 61 by counting the number of time code sync TCSYNC (PB) output by the reader 61, and the speed detection result is output to the main central processing unit 20. In this way, in the magneto-optic disc device 2, the format of the time codes recorded on the optical disc 10 may also be detected if necessary.

A playback time code speed detecting circuit 67 also detects the speed of the time codes input from the external time code reader 64 by counting the number of time code sync TCSYNC (EXT) output by the reader 64, and the speed detection result is output to the main central processing unit 20. In this way, in the magneto-optic disc device 2, the format of the time codes input from an external instrument may also be detected if necessary.

A selection circuit 68 receives the time code sync TCSYNC (PB) output by the playback time code reader 61, the time code sync TCSYNC (EXT) output by the external time code reader 64 and the time code sync TCSYNC (AAIP) output by the counter 56 (FIG. 4), and selects and outputs a time code sync specified by the time code control circuit 54 (via the inverter circuit 69).

A PLL circuit 70 generates and outputs a specified clock based on the time code sync TCSYNC output by this selection circuit 68. The PLL circuit 70 is also controlled by the main central processing unit 20 via the time code control circuit 54 to change over operation, and generate a clock based on a pseudo time code sync TCSYNC (ST) instead of the time code sync TCSYNC during a specified interval.

The time code generator 60 counts the clock output by the PLL circuit 70 and outputs a time code TC. At this time, the time code generator 60 changes over operation due to control data CT output by the time code control circuit 54, and generates a time code TC according to a format set by the main central processing unit 20.

The time code generator 60 is constructed so that a preset value DT of the time code TC can be set by the main central processing unit 20 if necessary, and the time code TC advanced by this preset value DT. The time code generator 60 is further constructed so that it mutes the output of the time code TC during a specified interval, and it is controlled by the main central processing unit 20 so that advance of the time code TC is stopped at a specified time and maintained in a hold state.

In this way, in the magneto-optic disc device 2, the preset value DT is selected so that even when track jump or other operations are repeated, a correct time code for the target track can be output, and can also be output by giving an offset value to the playback time code TC (PB).

In other words, in the selection circuit 59, the playback time code TC (PB) is selected, and when the time code sync TCSYNC (PB) output by the playback time code reader 61 is selected by the selection circuit 68, the time code generator 60 sequentially advances the time code TC in synchronism with the time code TC (PB) reproduced from the optical disc 10. In this case, therefore, a desired value is set at as a preset value DT, and a time code TC which is offset by this preset value DT is output relative to the time code TC (PB) reproduced from the optical disc 10.

Also in the selection circuit 63, when a time code TC (EXT) input from an external instrument is selected, and a time code sync TCSYNC (EXT) output by the external time code reader 64 is output by the selection circuit 68, the time code generator 60 sequentially generates a time code TC in synchronism with the time code TC (EXT) input from the external instrument.

In the selection circuit 68, when the time code sync TCSYNC (AAIP) is selected, the time code generator 60 sequentially advances the time code TC based on audio data blocks reproduced from the optical disc 10, so a time code TC with a desired format can be generated. Further, by setting a preset value DT based on a target block address, a corresponding time code can be generated even when track jump is repeated.

When a time code TC is generated by the time code generator 60 from the time code sync TCSYNC (AAIP), the contact points of the selection circuits 59, 63 are changed over so that a desired time code TCSYNC is supplied to the input/output circuit 51.

In the time code generation and processing performed in the PLL circuit 70 and time code generator 60, the PLL circuit 70 drives the time code generator 60 to output time codes from the time code sync output by the selection circuit 68 during the time that the time code generation flag AAIP GEN ENABL is up, and drives the time code generator 60 from a pseudo time code sync TCSYNC (ST) output by the reference signal generating circuit 52 under control by the main central processing unit 20 during the time that the time code generation flag AAIP GEN ENABL is down.

A selection circuit 73 is controlled by the time code control circuit 54 to send the time code TC generated by the time code generator 60, the reproduced time code TC (PB) output by the selection circuit 57 or the time code TC (EXT) input from an external instrument, to an external instrument.

Likewise, a selection circuit 74 is controlled by the time code control circuit 54 so as to change over contact points, the time code TC, time code TC (PB) or time code TC (EXT) is selected, and the selected time code is output to the modulating/demodulating circuit 53 as the time code TC (PB) recorded on the optical disc 10. The selection circuit 74 then outputs the selected time code either directly via a selection circuit 75, or via the selection circuit 75 after making time adjustment by a delay circuit (D) 76 relative to audio data as may be necessary.

Likewise, a selection circuit 77 is controlled by the time code control circuit 54 so as to change over contact points, the time code TC, time code TC (PB) or time code TC (EXT) is selected, and the selection is output to a level detecting circuit 79. The level detecting circuit 79 integrates the selection output of the selection circuit 77 and detects its signal level, and in the magneto-optic disc device 2, this level detection result is output to a specified meter so as to verify the presence or absence of a time code.

A selection circuit 80 is controlled by the time code control circuit 54 so as to change over contact points, the time code TC, time code TC (PB) or time code TC (EXT) is selected, and the selection is output to a generator reader (GEN reader) 81. The generator reader 81 detects hours, minutes, seconds and frames for time codes selectively output by the selection circuit 80. In the magneto-optic disc device 2, the time code TC is verified by the main central processing unit 20 via the time code control circuit 54, and the detection result from the generator reader 81 is displayed via the display unit F.

In this embodiment, the main central processing unit 20 controls the overall operation of the system in response to an operator selection or in response to remote control from an external instrument, and thereby changes over the operating mode of the magneto-optic disc device 2. In this control, the main central processing unit 20 sequentially and cyclically changes over the operating mode when an operating mode control disposed on the control panel is depressed by the operator in the recording/playback stop control mode of the optical disc 10.

In the magneto-optic disc device 2, operating modes that may be selected are normal mode, disc mode, file mode and copy mode. The normal mode is selected when an audio signal input from an external instrument is recorded on the optical disc 10 so that registration and verification of an in-point and out-point can be performed.

The disc mode is a special playback mode for playing back audio data in track units registered in the normal mode, and in the present embodiment, the interval between an in-point, out-point pair registered in the normal mode is specified as a track. The file mode is selected when specifying a program sequence of a plurality of tracks with registered tracks as units and generating an edit list, and is executed together with verification of an audio data sequence (referred to hereinafter as file) according to the generated edit list. The copy mode is selected when copying the optical disc 10.

Figure 12:
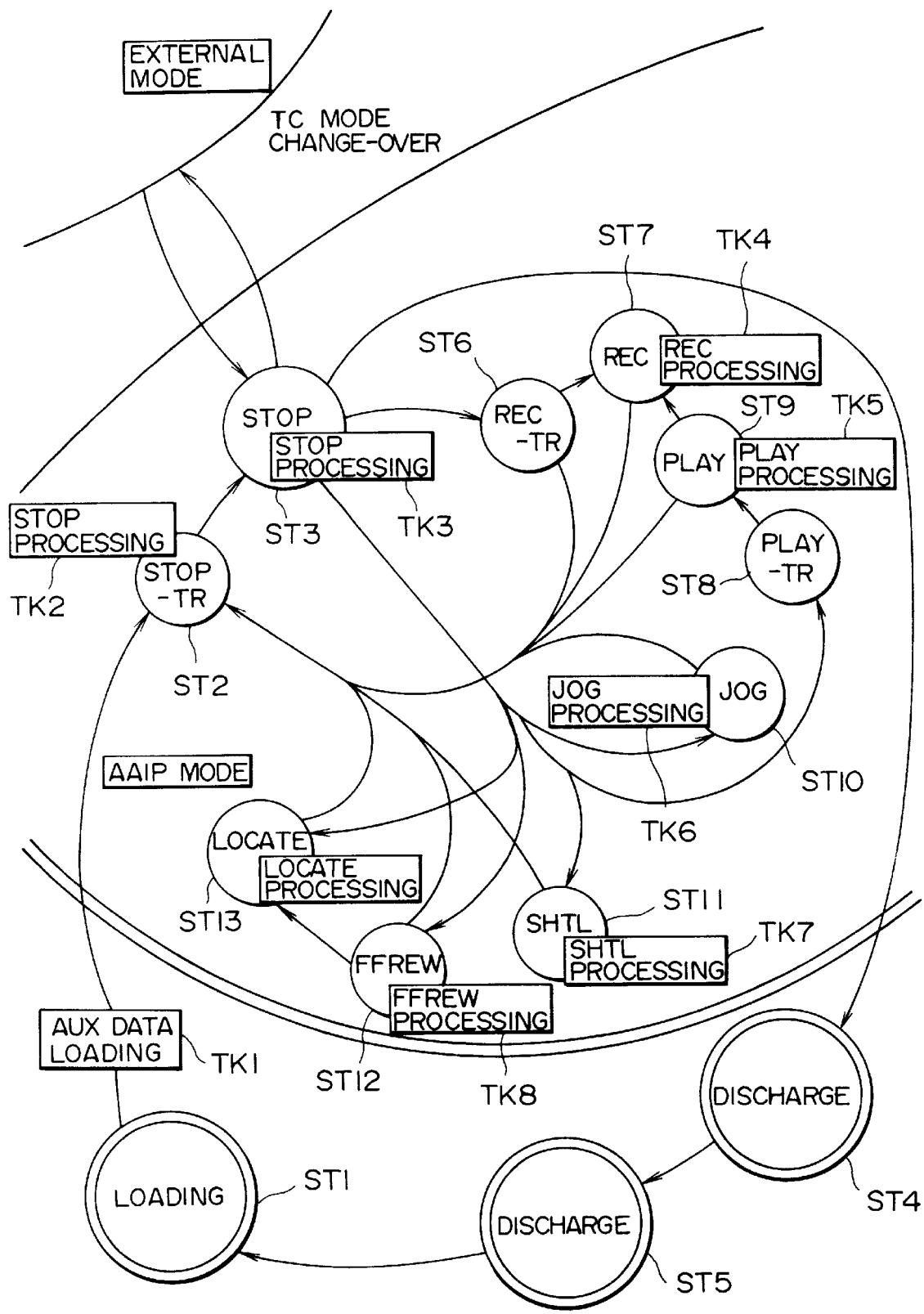
FIG. 12 is a schematic diagram for the purpose of explaining a status of a main central processing unit 20.

FIG. 12 is a status transition diagram showing the status changes of the main central processing unit 20 controlling the operation of the whole magneto-optic disc device 2. When the optical disc 10 is inserted, the main central processing unit 20 shifts to a loading status ST1, and after controlling the servo circuit 13 so as to rotate the optical disc 10, a processing sequence is performed to load control data from the inner circumference area AUX to the TOC buffer 27 (AUX DATA LOAD) (TK1).

Next, the main central processing unit 20 shifts to an operating mode (AAIP mode) wherein the optical disc 10 is accessed based on the address information AAIP recorded on the optical disc 10, and after performing a processing sequence TK2 wherein the optical pickup 11 moves to a specified standby position in a status (stop TR) ST2, the system shifts to a stop status ST3. In this stop status ST3, the main central processing unit 20 executes a stop process TK3 wherein it waits for operations of specified controls. The status can then be changed from this stop state in response to the operation of the remote controller 45.

In other words, in this stop state ST3 when an eject control is operated, the main central processing unit 20 shifts to a step ST4 wherein the optical disc 10 is ejected, and when the ejection is complete, the system shifts to a status ST5 wherein insertion of the optical disc 10 is awaited. When a recording control is operated on the other hand, the main central processing unit 20 shifts to a recording status (REC) ST7 after a transient status (REC TR) ST6, and a recording process (REC process) TK4 is executed. When this process is complete, after the transient status ST2, the system returns to the stop status ST3.

Likewise, when a playback control is operated, the main central processing unit 20 shifts to a playback status (PLAY) ST9 after a transient status (PLAY TR) ST8, and a playback process (PLAY process) TK5 is executed. When this process is complete, after the transient status ST2 or after the transient status ST2 via the recording status ST7, the system returns to the stop status ST3. When a jog dial is operated, the system shifts from the stop status ST3 to a jog process status (JOG) ST10, a jog process sequence (JOG process) TK6 corresponding to the jog dial operation is performed, and the system returns to the stop status ST3 via the transient status ST2.

When a shuttle playback control is operated, the system shifts from the stop status ST3 to a shuttle status (SHTL) ST11, and after executing a sequence of shuttle operations (SHTL operations) TK7, the system returns to the stop status ST3 via the transient status ST2. Also when fast forward and rewind controls are operated, the system shifts from the stop status ST3 to a fast forward/rewind status (FFREW) ST12. Following execution of a sequence of processes (FFREW) TK8, after the transient status ST2 or the transient status ST2 via a locate status (LOCATE) ST13, the system returns to the stop status ST3. Further in the locate process verifying an in-point and out-point, the system shifts after the stop status ST3 to the status S13 of the locate process, and after performing the locate process (LOCATE) TK8, the system returns to the stop status ST3 via the transition status ST2.

The main central processing unit 20 shifts to these statuses according to the operating mode selected by the operator. For example, in the special playback disc mode, a shift to the recording status ST7 is prohibited.

In the status ST8 which shifts to the playback status ST9, or in the status ST6 which shifts to the recording status ST7, a block address BAD or playback/recording command is issued to the servo control circuit 13, and the operation of signal processing circuits is set to the playback or recording mode. Further, the input/output circuit 51 (FIG. 4) is set to the operating mode specified by the operator.

In this mode, when there is a shift to the playback status ST9, playback of the optical disc 10 is started by the servo control circuit 13 at 2.5 times speed, and after playback data is stored in the buffer 15 from the position specified by the block address BAD and 40 blocks have been stored, due to input to the demodulating circuit 22 in synchronism with the block sync BSYNC, the main central processing unit 20 waits until playback data for the specified block address BAD is input to the demodulating circuit 22, and the system shifts to the playback status ST9.

When there is a shift to the recording status ST7, on the other hand, after storage of audio data in the buffer 16 begins in synchronism with the block sync BSYNC and the specified number of blocks has been stored, audio data is output from the buffer 16 at 2.5 times speed, and data is recorded from the recording position specified by the block address BAD. There is thus a shift to the recording status ST7.

Figure 13:
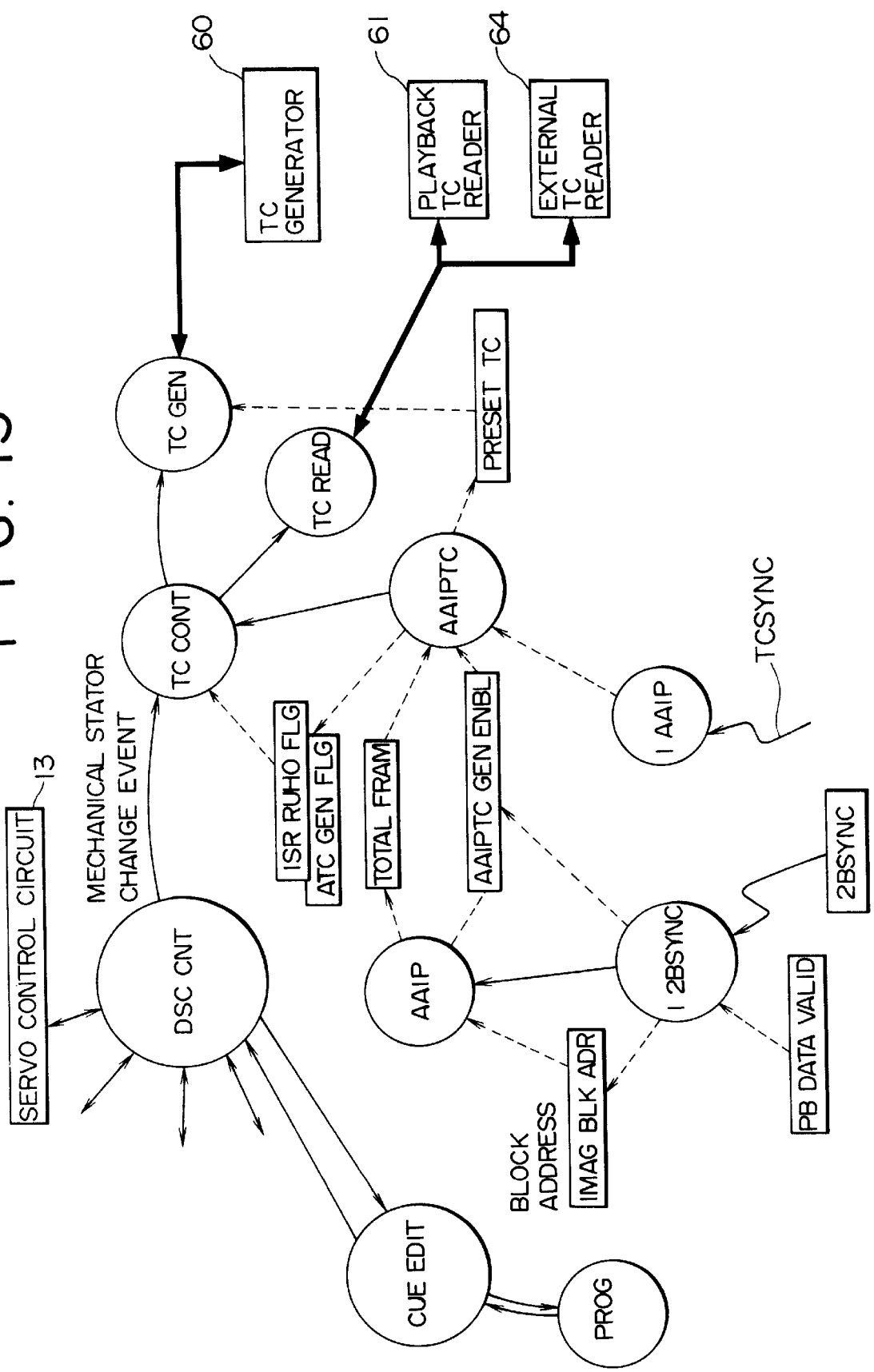
FIG. 13 is a task relationship diagram for the purpose of explaining time code generation during recording/playback in a normal mode.

FIG. 13 is a task diagram showing the processing and tasks for the recording/playback status in the normal mode. The main central processing unit 20 performs these tasks in a specified sequence, and time codes are generated.

A disc control task (DSC CNT) is a task which forms the core of the main central processing unit 20. In the main central processing unit 20, in this task, the operation of the whole system is controlled in response to operation of the controls. In this sequence of processes, commands are issued to tasks as necessary and tasks are managed.

The CUE EDIT task is a data base manager which converts control data read from the optical disc by a disc control task to a data base suitable for processing by the main central processing unit 20. This data base is updated by editing a program task (PROG), and search, etc., is executed as necessary. Also, when recording control data of the optical disc 10 is updated, this data base is converted back to recording control data.

The program task performs editing. In the main central processing unit 20, in the normal mode, the in-point is specified by the program task, this specified data is converted to a data base by the cue edit task so as to form tracks and files, and an edit list is generated.

The task (I 2BSYNC) is a task performed by the main central processing unit 20 which receives interrupt processing by the reference signal 2BSYNC that was described in the case of FIG. 6. Due to this task, an AAIP task AAIP starts, and the AAIP task AAIP accepts an interrupt due to an AAIPTC generation flag AAIPTC GEN ENABL.

The AAIP task AAIP performs interrupt processing by the reference signal that was described in the case of FIG. 5. By performing processing required to generate a time code sync TCSYNC (AAIP), a total number of frames TOTAL FRAM required to set a preset value DT in the time code generator 60 from the block address (IMAG BLK ADR) BAD when the interrupt is received, is computed. Further, when the operator has specified an offset to generate a time code, the AAIP task AAIP computes a total number of frames TOTAL FRAM from the block address (IMAG BLK ADR) obtained by adding this offset value.

For this total number of frames TOTAL FRAM, a total number of frames is used which is computed by a sequence of processes used to detect the surplus number of words described hereinabove in the case of FIG. 5. When the offset time code is generated, the present block address is added to a virtual block address, the addition result is multiplied by the number of words per block to generate the total number of words, and then this total number of words is divided by the number of words per frame. Hence when the offset time code is generated, a detected value which includes the virtual block address is set by the counter 56 for the surplus number of words described in the case of FIG. 5.

The AAIP task (I AAIP) is a task which receives an interrupt from the time code sync TCSYNC so as to start the AAIPTC task (AAIPTC). Due to this interrupt, the AAIPTC task generates a preset value DT (PRESET TC) which is set in the time code generator 60. This AAIPTC task also sets a run/hold flag (IRS RUHO FLG) to the operating status, and this flag notifies the operating status to the time code control task (TC CONT). It also sets a preset request (ATC GEN FLG) to the time code control task, to ON.

This preset value DT comprises hours, minutes, seconds and frames. In this embodiment, a time control table is formed by the TOC buffer 27 corresponding to the time codes, and a total number of frames is computed by the main central processing unit 20 based on the number of frames per hour, number of frames per minute and number of frames per second recorded in this time control table. The preset value DT is then detected from this computed value. In other words, in this embodiment, a time code control table is formed from the number of frames per hour, minute and second corresponding to each time code as shown in FIG. 14, and in the main central processing unit 20, the quotient obtained by dividing the total number of frames by the number of frames per hour is set to a preset value DT hours.

Further, the quotient obtained by dividing the remainder of this division, by the total number of frames per hour, is set to a preset value DT minutes, and the quotient obtained by dividing the remainder of this minutes division, by the total number of frames per second, is set to a preset value DT seconds. According to this embodiment, a preset value DT frames which takes account of the hours set by the time code generator 60, is set by adding the value 1 to the remainder obtained after calculating the preset value DT seconds.

The time code control task (TC CONT) is a time code control manager. In this case, a time code generator task (TG GEN) is started in response to a preset request or an operator selection operation, then a time code format and preset value are set in the time code generator 60. Accordingly, upon a time code control task request, a time code read task (TC READ) reads time codes detected by the time code reader 61 and external time code reader 64.

When the operator depresses a control due to task processing, and the system shifts from the stop status ST3 to the playback status ST9 or the recording status ST7, the main central processing unit 20 controls the operation of the whole system so as to generate time codes as shown in FIGS. 15A to 15G.

In the time code control task TC CONT when the system shifts to the stop status, the main central processing unit 20 stops counting by the counter 46, and holds the count at a constant value L at the block address BAD (FIG. 15A) in the stop mode. As the system is held in the stop status, the total number of frames TOTAL FRAM is held at a constant value N (FIG. 15B), and the count value in the time code generator 60 (i.e. the value of the time code represented by the frame address FAD (FIG. 15C) is also held at a constant value M.

In the time code control task TC CONT when the system shifts to this stop status, the time code generating flag AAIP GEN ENABL and playback data hybrid signal PB DATA VALID (FIGS. 15D and 15E) are set to OFF, and in this time code control task TC CONT, the time code generator 60 is set to hold. Further, in this transient status, the interpolation circuit 23 and time code generator 60 are held in the mute status by the disc control task DSC CONT, and therefore in this stop status, the audio output DA and time code output TC (FIGS. 15F and 15G) are held in the mute status.

When the operator depresses a control in this stop status, the main central processing unit 20 sends a control command corresponding to a control operation to the servo control circuit 13 in the status ST6 or ST8, and due to this mechanical status change event, the time code control task TC CONT starts. In this status, the main central processing unit 20 issues an interrupt at the time of the reference signal 2BSYNC corresponding to the block sync BSYNC from the I 2BSYNC task, output of audio data from the buffer 15 or 16 starts, and after the playback signal PB DATA VALID has appeared, a time code generating flag AAIP GEN ENABL appears delayed by 2 block periods. When this interrupt is accepted, the interrupt processing sequence described hereinabove for FIG. 5 is performed by the AAIP task. FIGS. 15A to 15G show an interrupt due to the reference signal 2BSYNC with the timing of the block sync BSYNC.

After output of audio data begins from the buffer 15 or 16, the main central processing unit 20 generates the time code TCSYNC from the counter 56 (FIG. 15C) in synchronism with this audio data delayed by 2 block periods. When the time code generating flag AAIP GEN ENABL appears, the main central processing unit 20 releases the mute of the interpolation circuit 23 due to the disc control task DSC CONT, and output of audio data therefore begins in sequential block units (to the demodulating circuit 22) (FIG. 15F).

The PLL circuit 70 changes over the operation base from the pseudo time code sync TCSYNC (ST) to the time code sync TCSYNC (AAIP), and releases the hold on the time code generator 60 due to the time code control task. A time code TC of which the value varies in synchronism with the time code sync TCSYNC (AAIP) is therefore output (FIG. 15G).

When the hold on the time code generator 60 is released, the main central processing unit 20 sets the preset value DT due to the AAIPTC task, in the time code generator 60. In other words as shown in FIGS. 16A to 16D, when this time code generation flag AAIP GEN ENABL appears, the main central processing unit 20 computes the preset value DT (RESET TC) from the total number of frames each time the time code sync TCSYNC (AAIP) appears due to the AAIPTC task (FIGS. 16A–16D).

Figures 16A, 16B, 16C, 16D, 16E, 16F, 16G:
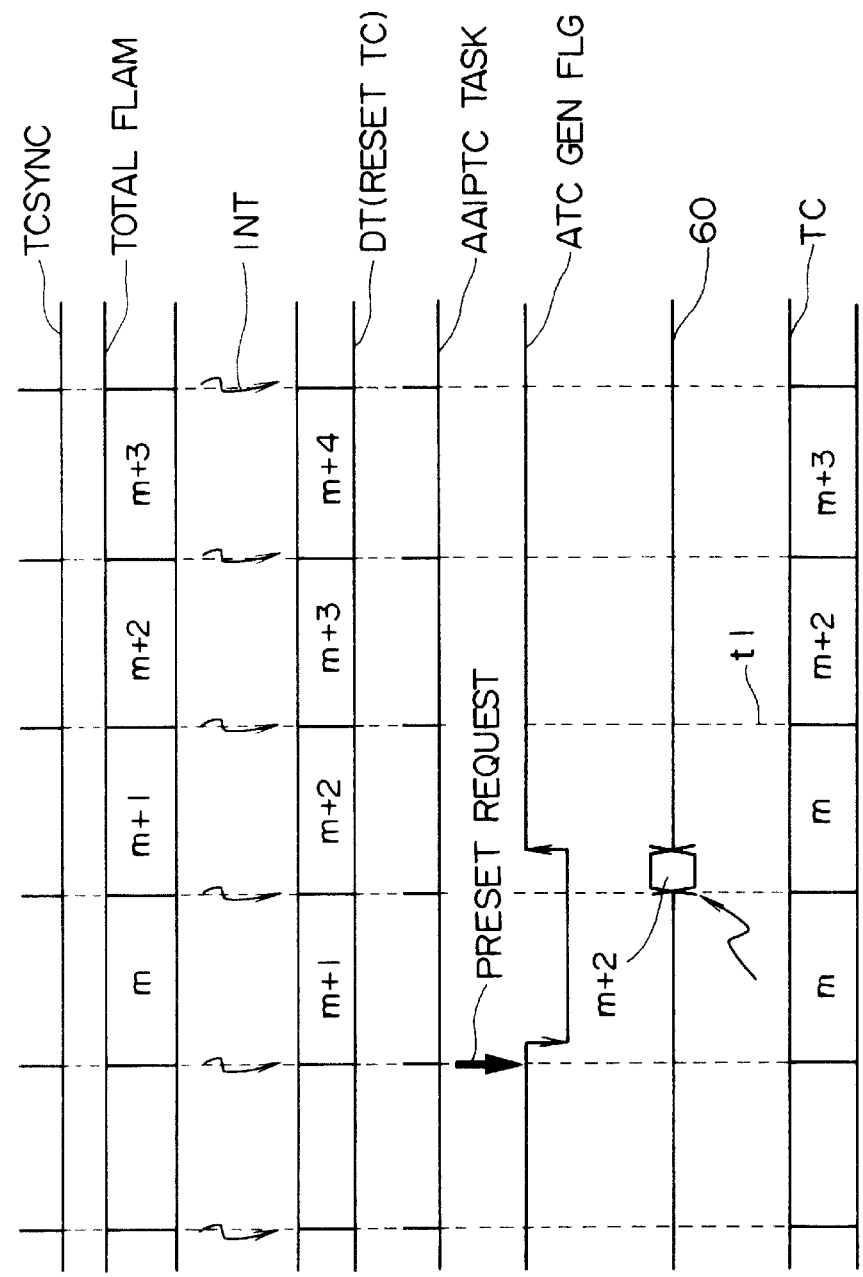
FIGS. 16A to 16G are signal waveform diagrams for the purpose of describing a preset of FIG. 15.

When the preset request ATC GEN FLG is down due to the AAIPTC task, the main central processing unit 20 also outputs a preset request to the TC GEN task. Due to this request, in the time code generator task, the main central processing unit 20 sets the preset value DT in the time code generator 60 (FIG. 16F). In the time code generator 60, the time code is sequentially advanced taking account of the operating time of the time code generator 60 from this preset value after a time t1 (m+2, where m=preset value+1).

Hence in the magneto-optic disc device 2, even after seek, a correct time code can be generated from the seek target block address. Consequently, when "non-linear"editing is performed in accordance with an edit list, recording/playback positions can easily be verified even when a time code has not been recorded, and editing is therefore simplified.

Also, when continuous audio data is reproduced, a time code with a desired offset value can be output. For example, when using an audio data signal that has been edited and re-recorded, a time code can be output and editing efficiency improved by the required offset. In this embodiment, in the normal mode, a desired offset value can be set in file units in response to an operator action.

When a preset value is set in this way, the main central processing unit 20 starts a TC READ task when the time code sync TCSYNC appears, the time code TC output by the time code generator 60 is read via the playback time code reader 61 and external time code reader 64, and compared with the preset value DT sequentially advanced by the time code sync TCSYNC. When a non-identical comparison result is obtained, the main central processing unit 20 again performs preset processing, and when an identical comparison result is obtained for a specified number of times, this comparison is stopped.

The main central processing unit 20 therefore effectively avoids incorrect setting of the time code generator 60.

In this normal mode, when recording/playback is performed by an external input time code TC (EXT), and when recording/playback is performed by a time code TC (PB) multiplexed with audio data or recorded alone, according to this embodiment, corresponding time codes are selected by the selection circuits 59, 63, 73, 74 as described hereinabove in the case of FIG. 11, and editing is performed by these time codes when task processing is stopped by the aforesaid interrupt.

In these cases, a corresponding time code is selected by the selection circuit 59, the time code generator 60 is driven by a time code sync due to this selected time code, and the aforesaid preset processing is performed. In these cases also, a desired offset value can be set, and editing is therefore made simpler.

When a locate control is operated, the main central processing unit 20 sequentially displaces the playback position to an operator-registered in-point and out-point. The main central processing unit 20 controls the overall operation by the disc control task in the inter-task relationship described hereinabove in the case of FIG. 13, time codes are managed by the time code control task, and time codes are generated.

Figures 17A, 17B, 17C, 17D, 17E:
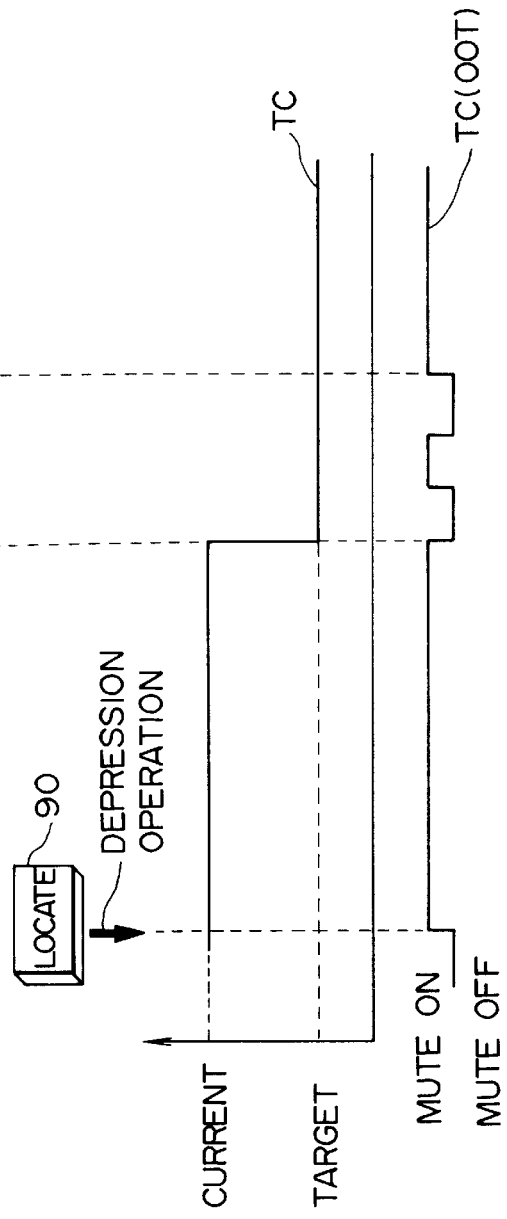
FIGS. 17A to 17E are signal waveform diagrams for the purpose of describing locate processing.

In other words, as shown in FIGS. 17A to 17E, when a locate control 90 on the control panel is depressed (FIG. 17C), the main central processing unit 20 shifts to the locate status ST13 (FIG. 17B), and a light-emitting element on the locate control is driven by the disc control task so that the locate control flashes (FIG. 17A). The main central processing unit 20 also changes over operation of the time code generator 60 by the time code control task via the time code generator task, and after the time code generator 60 has been put on hold (FIG. 17D), the mute on the time code TC output is released (FIG. 17E).

In this status, after the main central processing unit 20 has detected a target block address by the cue edit task, this block address is output together with a seek command to the servo control circuit 13, and the optical pickup 11 is made to seek an operator-registered in-point and out-point. This target block address is set a specified number of immediately preceding blocks in advance relative to the final target. The recording/playback system 19 therefore begins playback of audio data from the seek position. When the time code generator flag AAIP GEN ENABL appears when audio data is output from the buffer 15, the main central processing unit 20 shifts to the transient status ST2 to the stop status (FIG. 17B), and the stop display flashes due to the disc control task (FIG. 17A). The main central processing unit 20 also begins advancing the time code generator 60 by the time code generator task, and the time code TC output is muted (FIGS. 17D and 17E).

The main central processing unit 20 also performs the preset processing described hereinabove in the case of FIG. 16, and when the time code TC is correctly preset, a final target block address is specified and a stop command is issued to the servo control circuit 13. In this status, when the value of the time code TC is the seek target value, the main central processing unit 20 holds the time code generator 60 by the time code generator task, and in an external instrument, the mute on the time code TC output is released for a specified time so that the time code TC can be preset (FIGS. 17D and 17E).

In the time code control circuit 13 which received the stop command, the recording/playback system 19 performs "caching" so that, after the optical pickup 11 has returned to the recording/playback position corresponding to the final target address, the main central processing unit 20 notifies completion of processing. In this way, the main central processing unit 20 shifts to the stop status ST3 (FIG. 17B), and the stop flashing display on the control panel changes to a continuously lit display (FIG. 17A). The main central processing unit 20 also releases the mute on the time code TC output due to the time code generator task (FIG. 17E).

In the magneto-optic disc device 2, therefore, the recording/playback position is changed to the in-point or out-point registered by the operator, and the recording/playback position may thus be changed over in a short time by using a disc-shaped recording medium. Also, the time code at the seek target can be detected based on the block address even when a time code is not recorded on the optical disc 10, and editing efficiency is therefore improved.

When the operator selects a time code recorded on the optical disc 10, the corresponding time code is selected by the selection circuits 59, 63, 73, 74 and task processing by the aforesaid interrupt is stopped. Locate processing may therefore be performed by this time code.

In these cases, the corresponding time code is selected by the selection circuit 59, the time code generator 60 is driven by the selected time code, and the aforesaid preset processing is performed. In these cases also, a desired offset value may be set, and editing made simpler.

When there is a shift from another status to the stop status, as when there is a shift to the stop status in locate processing, the main central processing unit 20 controls the servo control circuit 13 so as to move the optical pickup 11 to a recording/playback position desired by the operator such that it complements caching by the recording/playback system 19, and in the same way, the time code generator 60 is preset so as to output a stop position time code.

When the operator depresses a JOG key, the main central processing unit 20 shifts to a jog status ST10, and the playback position is changed according to a jog dial rotation angle.

Figure 18:
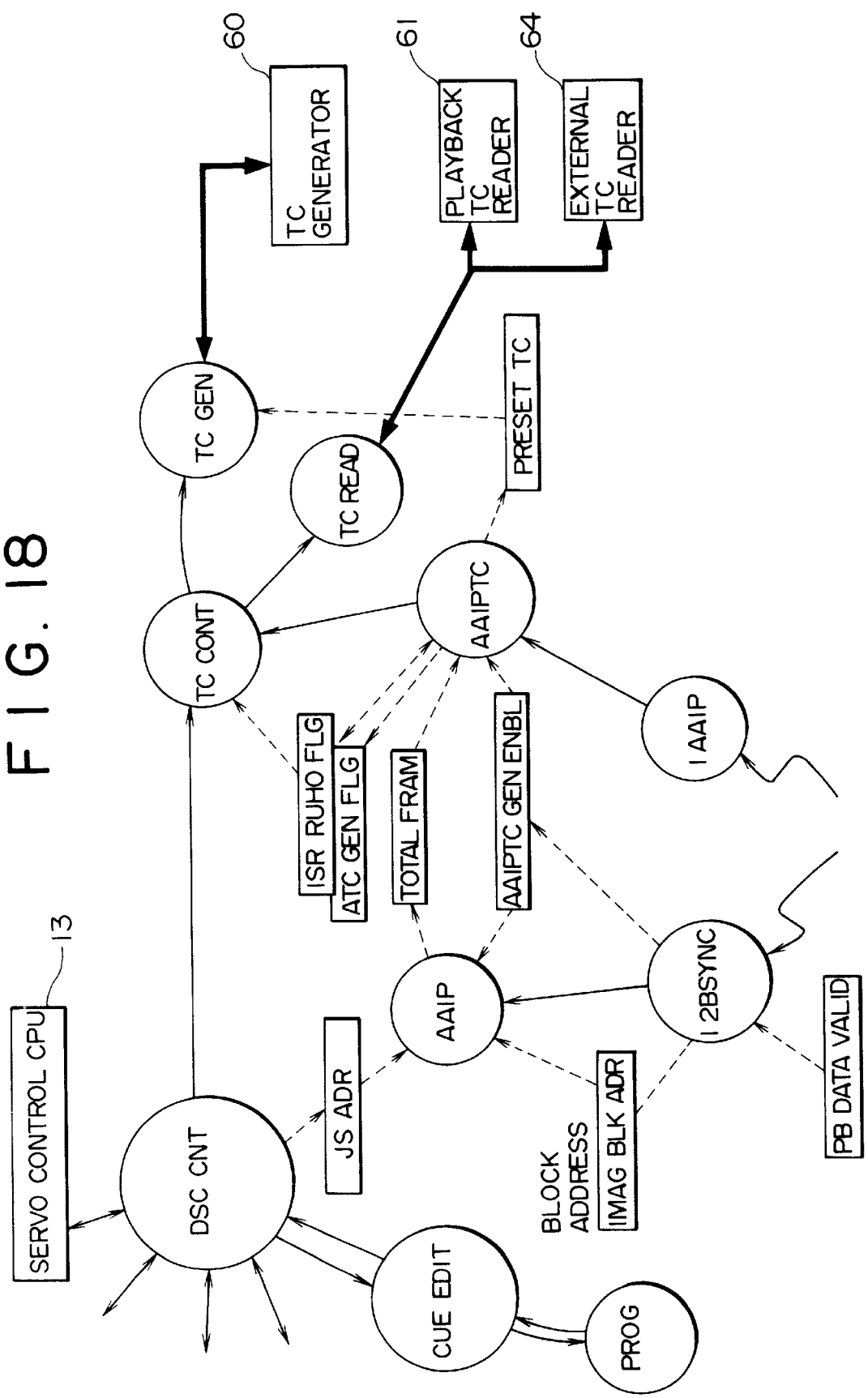
FIG. 18 is a status relationship diagram for the purpose of explaining time code generation in jog processing in the normal mode.

In the main central processing unit 20, as shown in FIG. 18, a block address value is generated according to a rotation angle of the jog dial in synchronism with the block sync BSYNC period, and the present block address is added to or subtracted from this block address so as to generate a jog processing block address JS ADR. The main central processing unit 20 also outputs this jog processing block address together with a seek command to the servo control circuit 13, and the optical pickup 11 is thereby caused to seek the recording/playback position corresponding to the jog dial control amount. The main central processing unit 20 also generates a time code sync from this block address JS ADR, generates a time code, and outputs this time code when audio data is played back by jog processing.

Figure 19:
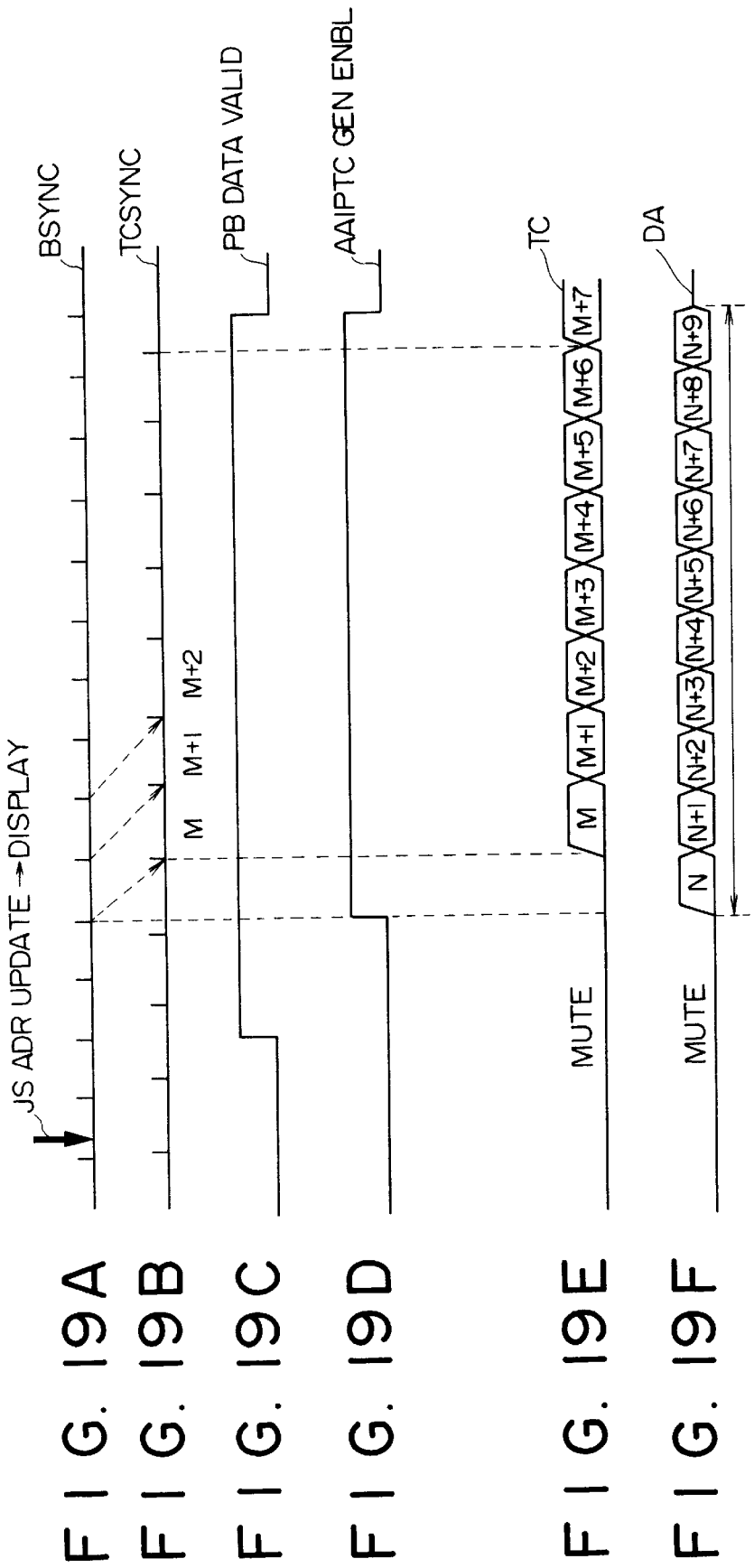
FIGS. 19A to 19F are signal waveform diagrams for the purpose of explaining the action of FIG. 18.

As shown in FIGS. 19A to 19E, the main central processing unit 20 outputs this jog processing block address JS ADR together with the seek command to the servo control circuit 13 when the time code output TC and audio data DA output are muted (FIGS. 19E and 19F). The block address JS ADR output to the servo control circuit 13 is therefore updated, and after the optical pickup 11 is caused to seek in response to the seek command, 10 blocks of audio data are played back and the overall operation changes over to the stop status.

The servo control circuit 13 generates a signal PB DATA VALID in response to this operation, (FIG. 19C), and the main central processing unit 20 generates a time code generation flag AAIP GEN ENABL corresponding to this playback data hybrid signal PB DATA VALID (FIG. 19D). In this case, when the main central processing unit 20 updates the block address JS ADR, the time code control circuit 54 is controlled so that a time code specified by this block address is immediately displayed on the display unit F (FIG. 19A).

After the seek command is issued, the main central processing unit 20 converts this jog processing block address JS ADR to a total number of frames whenever the block sync BSYNC (reference signal 2BSYNC) is made to appear by the AAIP task, and a surplus number of words required to generate a time code sync TCSYNC (AAIP) is calculated. The main central processing unit 20 also receives an interrupt due to a pseudo time code sync, and calculates a preset value from the total number of frames (FIG. 19B).

After the data hybrid signal PB DATA VALID appears in this state, when a time code generation flag AAIP GEN ENABL delayed by 2 block periods appears (FIGS. 19C and 19D), the main processing unit 20 sets the surplus number of words on the counter 56 by the AAIPTC task as in the case of recording/playback, and generates a time code sync TCSYNC based on the block address (FIG. 19B). The main central processing unit 20 also sets a preset value in the time code generator 60 by the time code control task.

In the magneto-optic disc device 2, therefore, 10 blocks of audio data are played back from a recording/playback position corresponding to the jog dial control position, and a time code corresponding to this audio data is output even when a time code is not recorded.

When output of 10 blocks audio data is complete, the main central processing unit 20 holds the operation of the time code generator 60, the time code TC output and audio data DA output are muted (Figs. 19E and 19F), and the aforesaid procedure is repeated. Hence in the magneto-optic disc device 2, after hearing this 10 blocks of audio data, the jog dial may again be controlled as necessary so that the recording/playback position is variable. It is therefore easy to hear the start of each track. In this case, when the jog dial is held at this control amount, the playback position is sequentially varied by a number of blocks corresponding to this control amount, so audio data is played back 10 blocks at a time.

In this case also, when the operator selects a time code recorded on the optical disc 10, the corresponding time code is selected by the selection circuits 59, 63, 73, 74 as in the case of recording/playback, and jog processing is performed by this time code by stopping task processing due to the aforesaid interrupt.

When the operator depresses a shuttle key, the main central processing unit 20 shifts to the shuttle status ST11, and fast forward/rewind is performed at a playback speed according to the jog dial rotation angle.

Figure 20:
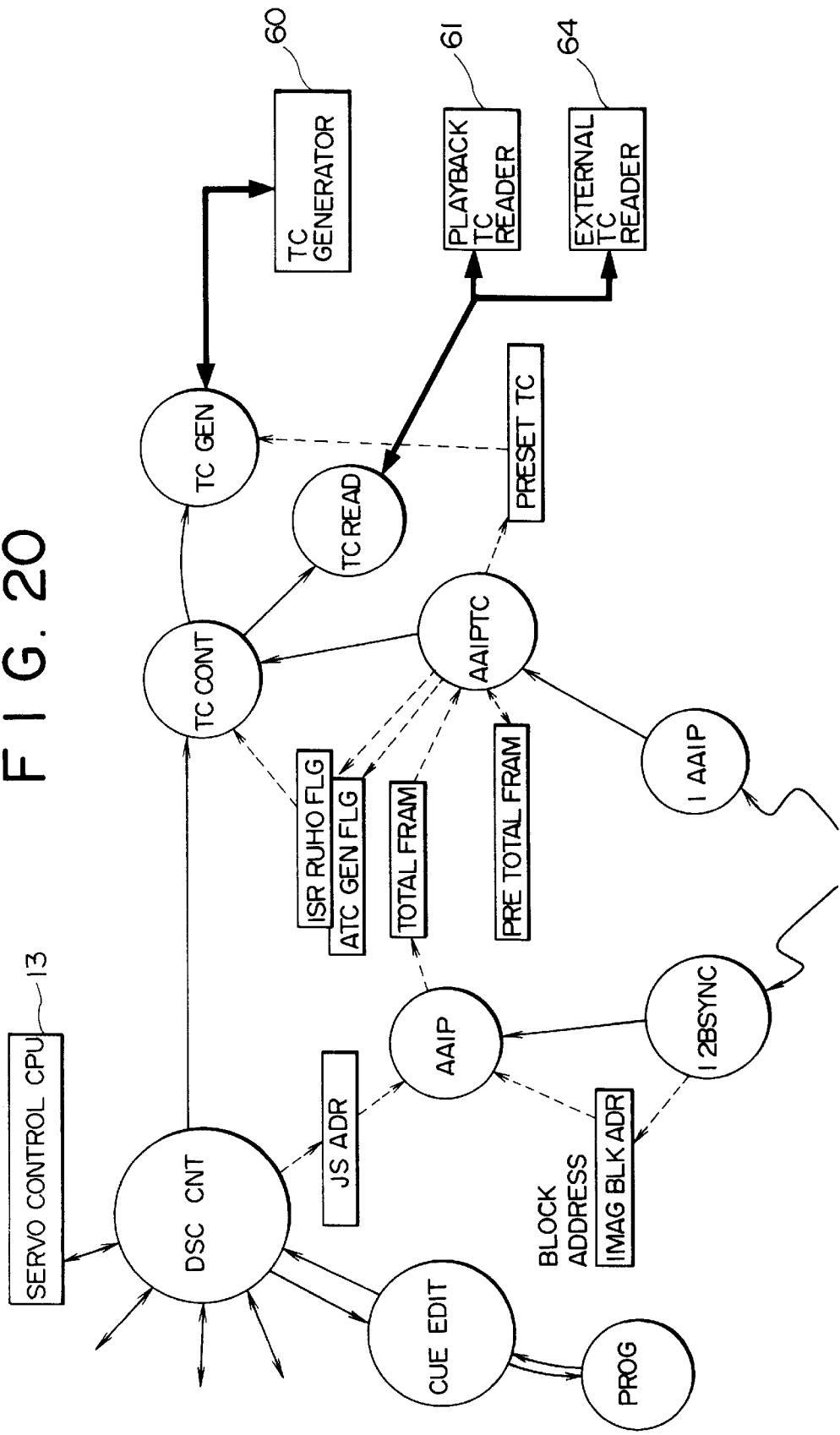
FIG. 20 is a task relationship diagram for the purpose of describing time code generation in shuttle processing in the normal mode.

As shown in FIG. 20, the main central processing unit 20 generates a block address value by the disc control task according to the jog dial rotation angle so that the speed of change is directly proportional to the jog dial rotation angle in synchronism with the block sync BSYNC period, and this block address value is added to or subtracted from the present block address to as to generate a shuttle processing block address JS ADR. The main central processing unit 20 also outputs this shuttle processing block address JS ADR together with a seek command, to the servo control circuit 13, and the optical pickup 11 is thereby caused to seek according to the jog dial control amount. The main central processing unit 20 also generates a time code sync and time code from this block address JS ADR, and outputs this time code when audio data is played back by the shuttle process.

In other words, the main central processing unit 20 outputs the shuttle processing block address JS ADR together with a seek command to the servo control circuit 13 when the audio data DA output is muted or the time code TC output is muted (in the hold state), the block address JS ADR output to the servo control circuit 13 is updated, and after the optical pickup 11 is caused to seek in response to the seek command, 4 blocks of audio data are played back and the operation changes to the stop state.

In this case also, the servo control circuit 13 generates a playback data hybrid signal PB DATA VALID in response to this operation, and when the block address JS ADR is updated, the main central processing unit 20 controls the time code control circuit 54 so that the time code specified by this block address JS ADR is immediately displayed on the display unit F.

After the main central processing unit 20 issues a seek command, this jog processing block address JS ADR is converted to a total number of frames each time the block sync BSYNC (reference signal 2BSYNC) appears due to the AAIP task, and the surplus number of words required to generate the time code sync TCSYNC (AAIP) is calculated. Further, the main central processing unit 20 sets the surplus number of words on the counter 56 due to the AAIPTC task, and a time code sync TCSYNC based on this block address is thereby generated.

In the main central processing unit 20, a preset value DT is calculated from the total number of frames each time the time code sync TCSYNC appears due to the AAIPTC task, and in this shuttle mode, when the total number of frames has changed from the immediately preceding calculated value (i.e. when playback data is sent by the buffer 15 and the block address BAD is counted up by the counter 46), a preset request ATC GEN FLG is issued without waiting for the data hybrid signal PB DATA VALID, and the preset value DT is set in the time code generator 60 by the time code generator task.

At the same time, the main central processing unit 20 releases the mute on the time code output, and when 4 blocks of time code TC are output, the aforesaid process sequence is again repeated. Hence in the magneto-optic disc device 2, a time code for a seek target repeated by shuttle processing can be detected even when a time code is not recorded on the optical disc 10, and editing is therefore simplified.

In this case also, when the operator selects a time code recorded on the optical disc 10, the corresponding time code is selected by the selection circuits 59, 63, 73, 74 as in the case of recording/playback, and shuttle processing is performed by this time code.

When the operator depresses a fast forward or rewind key, the main central processing unit 20 shifts to the FFREW status ST12, and after the time code has been updated at a specified rate, the system shifts to the stop status ST3 in response to a stop control operation. The optical pickup 11 is then moved to a recording/playback position specified by a time code which is the updated result via the locate status ST13.

As shown in FIG. 21, when the operator depresses a fast forward or rewind key, the main central processing unit 20 causes a time code control task to receive a notification due to a mechanical status change event, and the block address (IMAG BLK ADR) in the present position is copied to a virtual block address FFREW ADR by this time code control task.

The main central processing unit 20 sets a flag TC CHG FLG showing that this virtual block address FFREW ADR has been updated. In this state, the main central processing unit 20 calculates and sets a total number of frames from the virtual block address FFREW ADR at each block sync BSYNC (reference signal 2BSYNC). The main central processing unit also calculates a preset value of the time code from the total number of frames at each time code TCSYNC by the AAIPTC task, then time code mute, time code generator advance, request for calculation of next preset value and preset request are set in succession (MAG TC AAIPTC).

The main central processing unit 20 sends these requests to the time code control task with a specified timing, and processing is performed by this time code control task.

The main central processing unit 20 then calculates the block address FFREW ADR on the next occasion from the relation:

$$B = A + k(z+y) \tag{1}$$

where time code playback length is z time code mute length is y fast forward/rewind speed is k present block address is B block address FFREW ADR on the next occasion is A.

In this way, the block address FFREW ADR is successively updated, and a time code is generated from the updating result.

In this time code control task, the main central processing unit 20 sets a preset value DT in the time code generator in response to a preset request, the advance of the time code generator 60 begins in response to a time code generator advance request, and time code mute is released in response to a time code mute request.

In this state, when the time code generator 60 advances by the time code length z, the main central processing unit 20 stops the advance of the time code generator 60, mutes the time code output for a time code mute length y, and performs processing in response to the next preset value calculation request.

Figures 22A, 22B, 22C, 22D:
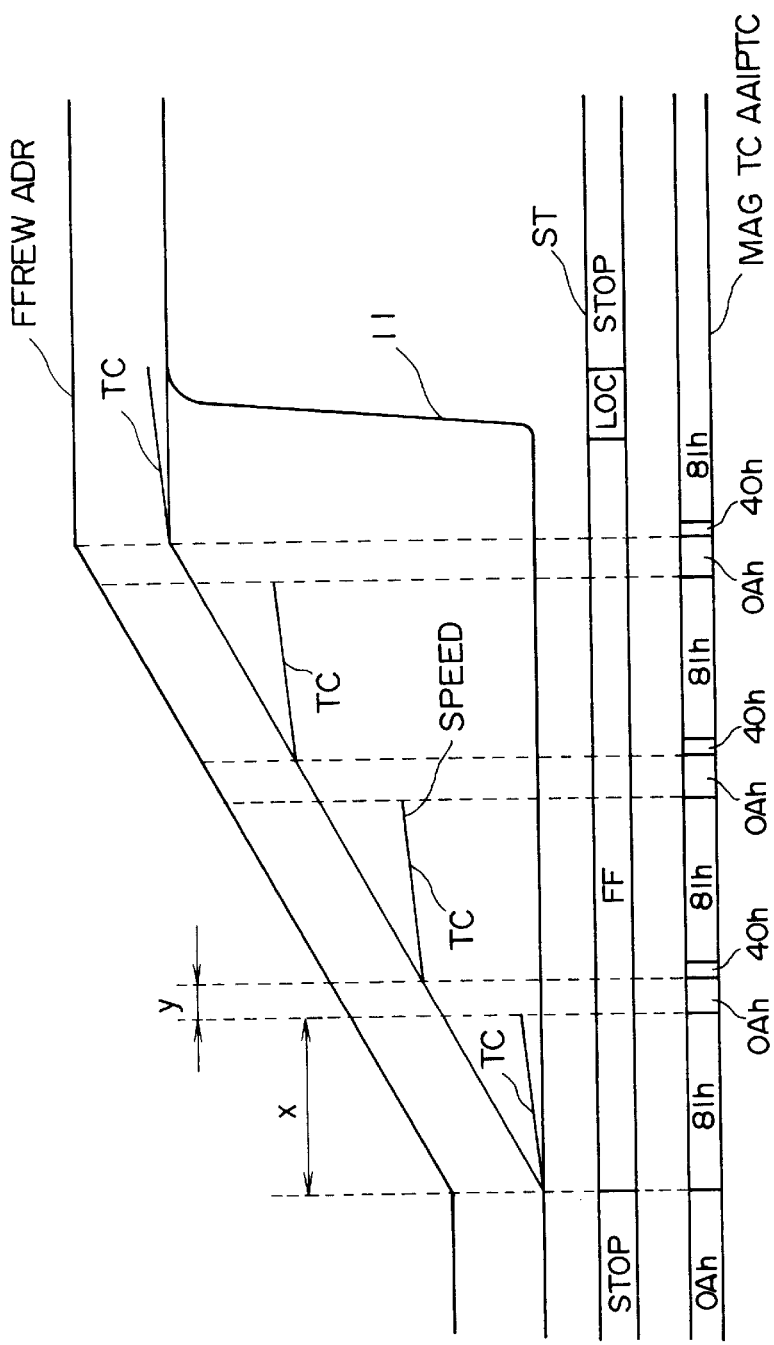
FIGS. 22A to 22D are signal waveform diagrams for the purpose of explaining the action of FIG. 21.

As shown in FIGS. 22A to 22D, in this computation process, when the operator depresses the fast forward or rewind key, the main central processing unit 20 sequentially updates the block address FFREW ADR at a specified rate until the stop control is depressed (FIG. 22A).

In this state, after the time code TC is output at double speed for a time code playback length z, the main central processing unit 20 mutes the time code output for the time code mute length y, and this processing is repeated until the stop control is depressed.

In MAG TC AAIPTC (FIG. 22D), a preset request, advance instruction for the time code generator 60 and time code mute OFF are indicated by 81h; hold of the time code generator 60 and time code mute ON are indicated by 0Ah; and the next preset value calculation request is indicated by 40h.

When a control is depressed, the main central processing unit 20 shifts to the stop status ST3 via the aforesaid locate status ST13 according to the flag TC CHG FLG, and after the optical pickup 11 has moved to a position specified by the final block address FFREW ADR, the overall operation is stopped (FIG. 22C).

Hence in the magneto-optic disc device 2, the start of each track can be heard as in the case of fast forward or rewind of a magnetic tape by operating the stop control while operating the fast forward/rewind controls and visually observing the change in the time code even when a time code is not recorded on the optical disc 10, and editing is therefore easier.

In this embodiment, after operating the fast forward/rewind controls, the system shifts to a corresponding status via the locate status ST13. The optical pickup 11 can therefore be moved to a recording/playback position desired by the operator even when depression of the stop control is omitted.

In this case also, when the operator selects a time code recorded on the optical disc 10, the corresponding time code is selected by the selection circuits 59, 63, 73, 74 as in the case of recording/playback, and fast forward/rewind can be performed by this time code.

Figure 23:
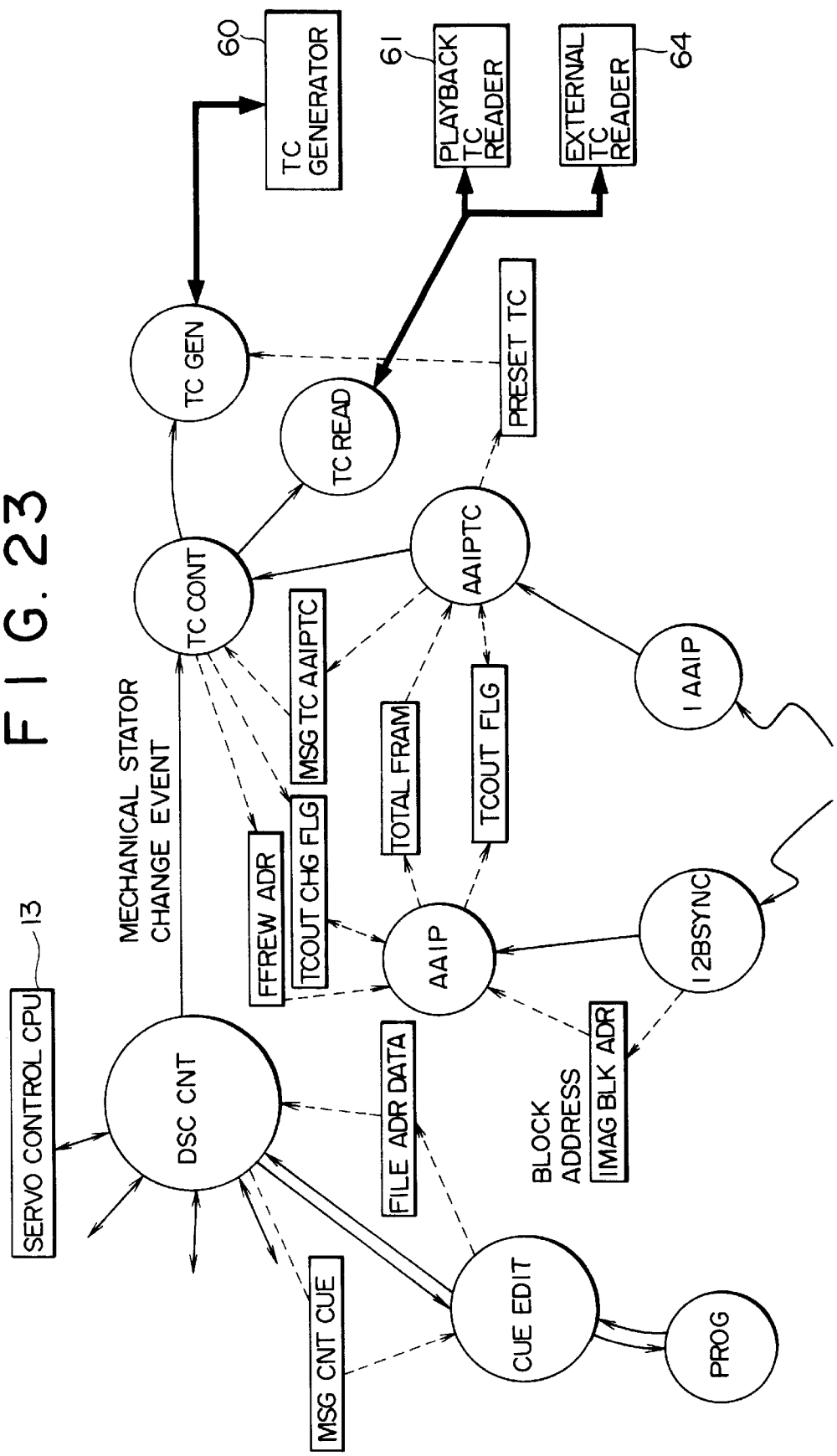
FIG. 23 is a task relationship diagram for the purpose of explaining time code generation in fast forward/rewind in a file mode.

FIG. 23 is a diagram showing the relationship between time code generating tasks in the file mode. The main central processing unit 20 generates a time code according to an edit list when the time code control task is started by the disc control task.

In this file mode, a virtual time code is specified having the start position of each file as origin, and the operator can verify the edit result from this virtual time code. The main central processing unit 20 therefore sets the present position due to this virtual time code and the position specified by the operator in the cue edit task by the disc control task, and converts them to real addresses (i.e. block addresses) FILE ADR DATA on the optical disc 10 by the cue edit task.

The main central processing unit 20 outputs a block address BAD from the real address due to the disc control task corresponding to an operator operation based on the virtual address, together with a control command, to the servo control circuit 13, and the operation of the whole system is thereby controlled to correspond with the virtual address. The main central processing unit 20 also provides the real address FILE ADR DATA due to the disc control task, to the time code control task, an AAIP task is started from this time code control task, and the total number of frames is calculated.

The main central processing unit 20, based on the real address FILE ADR DATA, converts the aforesaid block address for the normal mode to a block address corresponding to the virtual time code, calculates the total number of frames, and generates a preset value DT from this total number of frames. The main central processing unit 20 therefore generates a time code from a processing sequence identical to that described for the normal mode, converts the time code corresponding to the real address on the optical disc 10 to a virtual time code, and outputs it.

Figure 24:
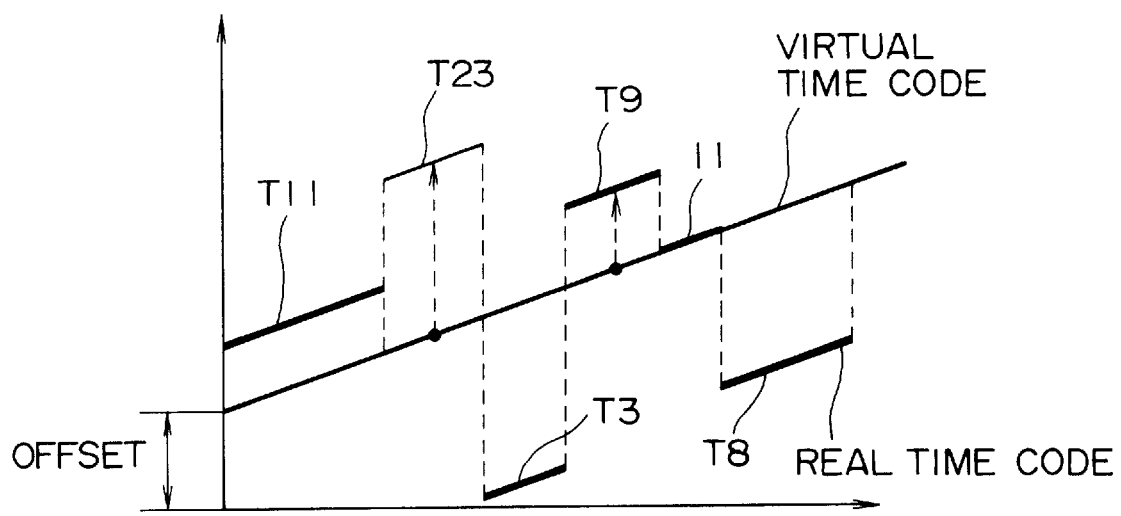
FIG. 24 is a characteristic curve for the purpose of explaining the action of FIG. 22.

Hence as shown in FIG. 24, according to this embodiment, when the operator constructs a file comprising a continuous sequence of tracks T11, T23, T3, T9 . . . by editing, the operator can operate stop and playback controls to verify the editing result while verifying the virtual time code via the display unit F.

Hence in this magneto-optic disc device 2, the edit result is output by a continuous time code even when the edit result is output directly by the edit list. Re-recording of the edit result as was done in the past can thus be omitted, and editing is simplified.

Further, when a preset value is set corresponding to the virtual time code, the main central processing unit 20 generates a preset value such that the virtual time code is offset by an offset set by the operator at the origin of each file. Therefore, even when for example this type of magneto-optic disc device 2 operates in parallel and edit results are output directly from an edit list, the edit results can be output by a continuous time code. Hence, even in this case, re-recording of the edit result as was done in the past can be omitted, and editing can be simplified.

Figure 25:
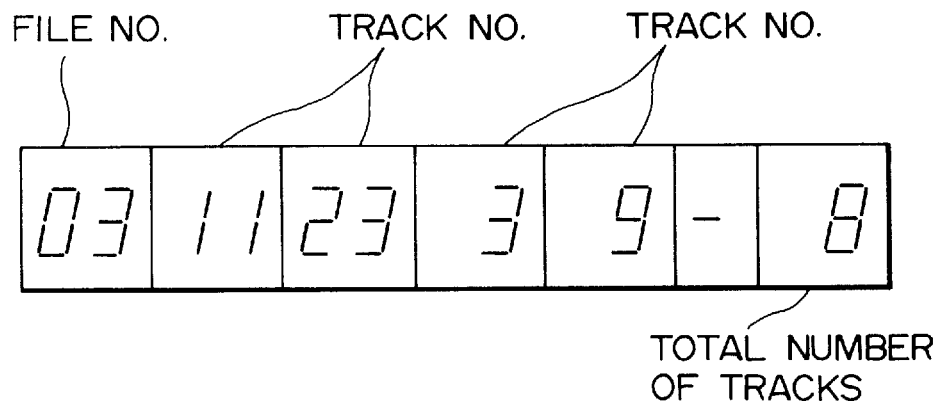
FIG. 25 is a schematic diagram showing a file mode display.

As shown in FIG. 25, according to this embodiment, the file number, track number and total number of tracks during playback can be verified, and this also simplifies editing.

According to the aforesaid construction, audio data input to the magneto-optic disc device 2 is output via the cross fader 25 to an external instrument as monitor, input to the modulating/demodulating circuit 17 via a cross fader 24, and after converting to a specified data structure in block units, it is input to the buffer 16. In this buffer 16, the audio data is time axis compressed, output to a driver 18 at a transfer speed 2.5 times the storage speed, and thermomagnetically recorded on the optical disc 10 via the driver 18.

At this time, in the magneto-optic disc device 2, a block address BAD output by the main central processing unit 20 in response to an operator action is output to the servo control circuit 13, the optical pickup 11 is moved to a recording position specified by this block address BAD, and audio data is thereby recorded in sequential block units from a recording/playback position specified by this block address BAD.

When the operator operates the playback control, a playback command and the block address BAD showing a playback start position are input to the servo control circuit 13 from the main central processing unit 20. The optical pickup 11 therefore seeks the recording/playback position specified by this block address, and audio data playback starts from this recording/playback position.

After a playback signal MO output by the optical pickup 11 is converted to playback data by a playback clock generated by the PLL circuit 14, the audio data played back from the optical disc 10 is input to the buffer 15. After this playback data is demodulated by the following demodulating circuit 22, it undergoes interpolation processing by the interpolation circuit 23 and is demodulated. The playback data is then played back at 2.5 times the data transfer rate from the optical disc 10, the time axis expanded by the buffer 15, and the data output.

In the magneto-optic disc device 2, in recording/playback a caching technique is applied, and continuous audio data can be transmitted or monitor recording performed even when an edit result is output directly from the edit list.

When the audio data is recorded/played back in this way, in the magneto-optic disc device 2, audio data is input/output in block units respectively by the buffers 15, 16 based on the block sync BSYNC signal which appears at each block of audio data. A playback data signal PB DATA VALID which appears when audio data in block addresses specified by the main central processing unit 20 is output by the buffers 15, 16, is generated, and a time code generation flag AAIP GEN ENABL which appears when this audio data is output by the interpolation circuit 23, is also generated.

In the magneto-optic disc device 2, the time when audio data specified by the main central processing unit 20 is input to/output by an external instrument based on the playback data hybrid signal PB DATA VALID and the time code generation flag AAIP GEN ENABL, is detected, and a time code is generated by the time code generator 60 from a preset value specified by the block address based on this timing.

In other words, the main central processing unit 20 receives an interrupt by the reference signal 2BSYNC which has ½ the period of the block sync BSYNC, the total number of frames and surplus number of words are calculated from the block address, this surplus number of words is set in the counter 56 when audio data having a corresponding block address is output by the buffers 15, 16, and a time code sync TCSYNC is thereby generated. Further, an interrupt due to the time code sync TCSYNC is received, a preset value generated by the total number of frames is set in the time code generator 60 corresponding to the time when audio data having a corresponding block address is output, and a time code is generated in this time code generator 60.

Hence, by setting this preset value by the seek target and the block address of the recording/playback start position, editing can be performed based on a time code even when a time code is not recorded on the optical disc 10, and an offset is applied to the preset value as necessary so as to offset the time code. This makes editing simpler.

In fast forward and rewind, a time code of a fast forward/rewind start position is updated at a specified rate, a preset value is set corresponding to the updated time code value in response to a stop control or other operation, and the optical pickup 11 is moved to the corresponding recording/playback position. In this way, editing such as searching for the start of tracks can be performed by a continuous time code as if editing were performed by a magnetic tape, and editing is further simplified.

When an audio data sequence is output by an edit list, a preset value is set corresponding to an operation of a control or corresponding to a file, and virtual time codes having the beginnings of files as origins are generated. Hence audio data can be output by a continuous time code even when edit results are output directly from an edit list.

According to the aforesaid construction, a time code reference generation signal is generated based on a block address for audio data recorded/played back in block units, and by setting a preset value based on this block address, a time code generator is driven by this time code generation reference signal. A present position can therefore be verified based on the generated time code even when a time code is not recorded on the optical disc 10, and editing is simplified.

An offset may also be applied to this preset value as necessary so as to offset the time code.

In fast forward and rewind, a time code of a fast forward/rewind start position is updated at a specified rate, a preset value is set corresponding to the updated time code value in response to a stop control or other operation, and the optical pickup 11 is moved to the corresponding recording/playback position. In this way, editing such as searching for the start of tracks can be performed by a continuous time code as if editing were performed by a magnetic tape, and editing is further simplified.

When an audio data sequence is output by an edit list, virtual time codes having the beginnings of files as origins are generated. Hence audio data can be output by a continuous time code even when edit results are output directly from an edit list.

In the aforesaid embodiment, this invention has been described in the case of its application to an magneto-optic disc device. The invention is however not limited to this case, and may be widely applied to an optical disc device using phase change, or to cases where audio data is recorded/played back by various disc-shaped recording media such as a floppy disc device or hard disc device.

Further the aforesaid embodiment has been described in the case of recording audio data on a disc-shaped recording medium, however the invention is not limited to this case, and may be widely applied to the case of data processing and recording of various information signals in block units, such as for example a video signal.

According to the invention described hereinabove, in a disc device wherein an information signal is processed in block units and recorded/played back on a disc-shaped recording medium, a time code is generated based on this block address. A present position can therefore be verified based on the generated time code even when a time code is not recorded on the disc-shaped recording medium, and editing is simplified.

Further, by generating and outputting a virtual time code based on these blocks, a continuous time code may be obtained when an edit result is output directly according to an edit list. The re-recording of the edit result may thus be omitted, and editing simplified.

What is claimed is:

1. A disc device for reproducing and outputting an information signal recorded on a disc-shaped recording medium, comprising:

reproducing, means for reproducing said information signal from said disc-shaped recording medium, said information signal being sequentially input and converted to a data structure having a specified format in specified block units, and time code generating means for generating a time code of said information signal reproduced by said reproducing means based on said information signal blocks and block addresses;

wherein position information indicating recording and playback positions is previously recorded on said disc-shaped recording medium by preformatting, and said information signal recorded on said disc-shaped recording medium is recorded on said disc-shaped recording medium in said block units based on said position information.

2. A disc device as defined in claim 1, wherein said time code generating means generates said time code by advancing said information signal by specified count means based on said information signal blocks and block addresses.

3. A disc device as defined in claim 2, wherein said time code generating means generates said time code by setting an initial value of said count means from the number of words in said information signal corresponding to said blocks, and advancing said information signal from this initial value, based on said information signal blocks and block addresses.

4. A disc device as defined in claim 1, wherein said reproducing means reproduces said information signal according to an edit list specified by a playback sequence, and said time code generating means generates said time code from a playback start block specified as origin by said edit list.

5. A disc device as defined in claim 1, wherein said time code generating means varies said time code in a specified operating mode in response to the operation of a specified control, and said reproducing means reproduces said information signal by blocks corresponding to said variable time code.

\* \* \* \* \*